(12) United States Patent
Yang et al.

(10) Patent No.: US 11,233,268 B2
(45) Date of Patent: Jan. 25, 2022

(54) ALKALI METAL BATTERY ELECTRODES AND RELATED METHODS

(71) Applicant: THE TRUSTEES OF COLUMBIA UNIVERSITY IN THE CITY OF NEW YORK, New York, NY (US)

(72) Inventors: Yuan Yang, New York, NY (US); Zeyuan Cao, Philadelphia, PA (US)

(73) Assignee: The Trustees of Columbia University In The City of New York, New York, NY (US)

( * ) Notice: Subject to any disclaimer, the term of this patent is extended or adjusted under 35 U.S.C. 154(b) by 0 days.

(21) Appl. No.: 16/073,593

(22) PCT Filed: Jan. 26, 2017

(86) PCT No.: PCT/US2017/015118
§ 371 (c)(1),
(2) Date: Jul. 27, 2018

(87) PCT Pub. No.: WO2017/132370
PCT Pub. Date: Aug. 3, 2017

(65) Prior Publication Data
US 2019/0044183 A1    Feb. 7, 2019

Related U.S. Application Data

(60) Provisional application No. 62/287,550, filed on Jan. 27, 2016.

(51) Int. Cl.
*H01M 10/0525* (2010.01)
*H01M 4/139* (2010.01)
*H01M 10/058* (2010.01)
*H01M 4/13* (2010.01)
*H01G 11/28* (2013.01)
*H01G 11/46* (2013.01)
*H01G 11/38* (2013.01)
*H01M 4/66* (2006.01)
(Continued)

(52) U.S. Cl.
CPC ........ *H01M 10/0525* (2013.01); *H01G 11/28* (2013.01); *H01G 11/38* (2013.01); *H01G 11/46* (2013.01); *H01M 4/13* (2013.01); *H01M 4/139* (2013.01); *H01M 4/382* (2013.01); *H01M 4/583* (2013.01); *H01M 4/661* (2013.01); *H01M 10/058* (2013.01); *H01G 11/06* (2013.01); *H01G 11/50* (2013.01); *H01M 2004/021* (2013.01); *Y02T 10/70* (2013.01)

(58) Field of Classification Search
CPC ... H01M 10/0525; H01M 4/139; H01M 4/382
See application file for complete search history.

(56) References Cited

U.S. PATENT DOCUMENTS 3,395,048 A    7/1968  Palovic
5,219,680 A *  6/1993  Fauteux ................ H01M 4/044
                                                        429/306
(Continued)

*Primary Examiner* — Ula C Ruddock
*Assistant Examiner* — Thomas H. Parsons
(74) *Attorney, Agent, or Firm* — Murtha Cullina LLP; Anthony P. Gangemi

(57) ABSTRACT

The present disclosure provides energy storages devices that include electrodes that comprise an alkali metal. The present disclosure also provides related methods of using and fabricating the disclosed devices.

20 Claims, 23 Drawing Sheets

(51) Int. Cl.
*H01M 4/38* (2006.01)
*H01M 4/583* (2010.01)
*H01G 11/06* (2013.01)
*H01G 11/50* (2013.01)
*H01M 4/02* (2006.01)

(56) References Cited

U.S. PATENT DOCUMENTS

| | | |
|---|---|---|
| 5,437,692 A | 8/1995 | Dasgupta et al. |
| 2003/0118904 A1 | 6/2003 | Hosokawa et al. |
| 2008/0226984 A1 | 9/2008 | Lee et al. |
| 2015/0295246 A1* | 10/2015 | Son .................... H01M 4/134 |
| | | 429/163 |

* cited by examiner

ALKALI METAL BATTERY ELECTRODES AND RELATED METHODS

CROSS-REFERENCE TO RELATED APPLICATIONS

The present application is a National Stage Application filed under 35 U.S.C. 371 of International Patent Application No. PCT/US2017/015118 filed Jan. 26, 2017, which claims priority to and the benefit of U.S. patent application 62/287,550, "Alkali Metal Battery Electrodes and Related Methods" (filed Jan. 27, 2016), the entirety of which applications are incorporated herein by reference for any and all purposes.

TECHNICAL FIELD

The present application relates to the field of energy storage devices.

BACKGROUND

In traditional Li-ion batteries, lithium is stored in the positive electrode (e.g., $LiCoO_2$, 140 mAh/g) but not the negative electrode (e.g., graphite, 372 mAh/g, silicon, tin). Developing lithiated negative electrodes (e.g., $Li_xC_6$) can thus enable use of high capacity cathode (e.g., $V_2O_5$, polymer, $MnO_2$, sulfur, air) and increase the energy density of full battery by 10-500%. Lithiated anodes, however, are not air and moisture-stable, which makes such anodes incompatible with standard fabrication processes. Accordingly, there is a long-felt need in the art for stable anodes that include alkali metal (e.g., Li). There is also a related need in the art for methods of fabricating and using such devices.

SUMMARY

In meeting these long-felt needs, the present disclosure provides lithiated electrodes (and related fabrication and usage methods) that are compatible with standard battery fabrication process.

In one aspect, the present disclosure provides energy storage devices, comprising: a first electrode material and a second electrode material; and an electrolyte that places the first electrode material into electronic communication with the second electrode material; the first electrode material being in electronic communication with a conductive substrate, and the first electrode material comprising an amount of an alkali metal.

Also provided are workpieces, comprising: a conductive substrate; an amount of an alkali metal disposed on the conductive substrate; and an amount of a sealant surmounting the amount of alkali metal so as to at least partially seal the amount of alkali metal against the environment exterior to the amount of alkali metal.

Additionally provided are methods of fabricating an energy storage device, comprising: disposing an amount of an alkali metal atop a conductive substrate; with a sealant, sealing the amount of alkali metal against the environment exterior to the amount of alkali metal, the sealant optionally comprising an amount of a conductive material; giving rise to an amount of a porous electrode material surmounting the sealant; contacting the amount of electrode material with an electrolyte under such conditions that at least a portion of the sealant dissolves in the electrolyte and the alkali metal is integrated with the electrode material.

Further disclosed are methods of fabricating an energy storage device, comprising: disposing an amount of an alkali metal atop a porous substrate, the substrate being disposed between a first electrode material and a second electrode material; with a sealant, sealing the amount of alkali metal against the environment exterior to the amount of alkali metal; and contacting the amount of electrode material with an electrolyte under such conditions that at least a portion of the sealant dissolves in the electrolyte and the alkali metal is integrated with the first electrode material, the second electrode material, or both.

Also provided are workpieces, comprising: a porous substrate; an amount of an alkali metal disposed on the conductive substrate; and an amount of a sealant surmounting the amount of alkali metal so as to at least partially seal the amount of alkali metal against the environment exterior to the amount of alkali metal.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
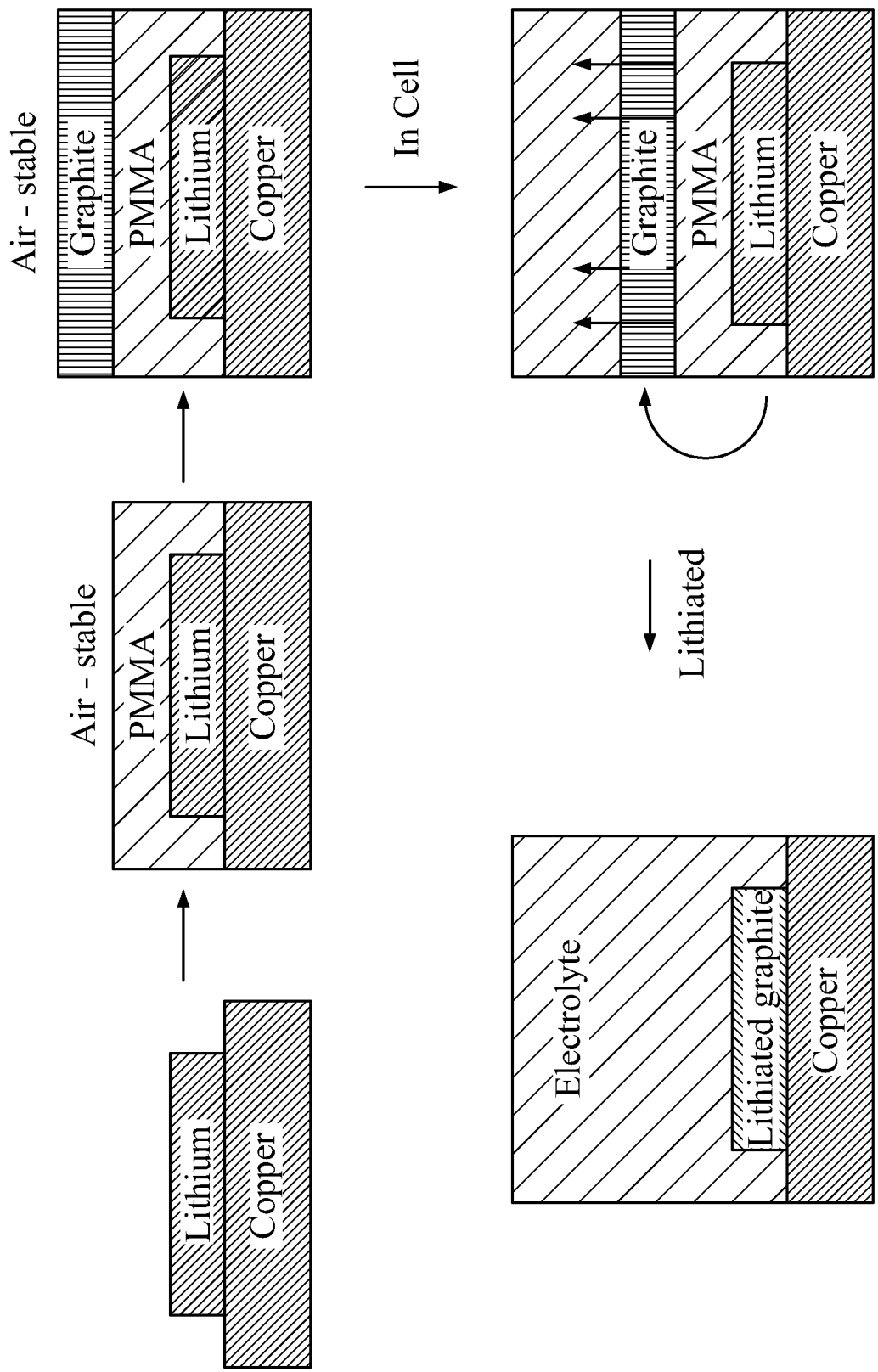
FIG. 1 depicts an exemplary process for fabricating negative electrodes according to the present disclosure.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any subcombination. Further, reference to values stated in ranges includes each and every value within that range. Any documents cited herein are incorporated herein by reference in their entireties for any and all purposes.

The following aspects are illustrative only and do not limit the scope of the present disclosure.

Aspect 1. An energy storage device, comprising: a first electrode material and a second electrode material; and an electrolyte that places the first electrode material into electronic communication with the second electrode material; the first electrode material being in electronic communication with a conductive substrate, and the first electrode material comprising an amount of an alkali metal. It should be understood that the negative electrodes may be air-stable and that may be compatible with existing battery fabrication processes.

Aspect 2. The energy storage device of aspect 1, wherein the conductive substrate comprises a metal. It should be understood that the term "metal" in this context includes metals as well as metal blends and alloys. It should be understood that the conductive substrate may comprises an electronic conductor (e.g., a metal such as Cu, Ag, or Ni); a carbon-based electronic conductor (e.g., carbon nanotubes, graphite, graphene, carbon black, and the like); and any combination thereof. Copper and nickel (e.g., in foil form) are considered especially suitable metals.

Aspect 3. The energy storage device of aspect 2, wherein the metal comprises copper, nickel, cobalt, tungsten, or any combination thereof. Copper is considered especially suitable.

Aspect 4. The energy storage device of any of aspects 1-3, wherein the first electrode material is porous. The porous electrode material may have the configuration of a layer of material having pores formed therein. The porous electrode material may also have the configuration of a plurality of particles, which particles may be bound, sintered, or otherwise attached to one another, with the pores being defined by the interstitial spaces between particles.

Aspect 5. The energy storage device of any of aspects 1-4, wherein the amount of first electrode material has a characteristic cross-sectional dimension in the range of from about 1 micrometer to about 1 mm, e.g., from about 1 to about 1000 micrometers, from about 100 to about 900 micrometers, from about 200 to about 800 micrometers, from about 300 to about 700 micrometers, from about 400 to about 600 micrometers, or even about 500 micrometers.

Aspect 6. The energy storage device of aspect 5, wherein the amount of first electrode material has a characteristic cross-sectional dimension in the range of from about 10 micrometers to about 500 micrometers, e.g., from about 50 to about 400 micrometers, from about 100 to about 350 micrometers, from about 150 to about 300 micrometers, from about 200 to about 250 micrometers, or even about 225 micrometers.

Aspect 7. The energy storage device of any of aspects 1-6, wherein the first electrode material comprises silicon, carbon, a metal, a metal oxide, sulfur, or any combination thereof.

In some embodiments, the first electrode material may be characterized as being an anode material. Silicon and carbon are considered especially suitable anode materials. In some embodiments, the first electrode material may be characterized as being a cathode materials; sulfur, tin, and vanadium oxides are considered suitable cathode materials.

Aspect 8. The energy storage device of aspect 7, wherein the first electrode material comprises graphite, carbon nanotubes, graphene, or any combination thereof.

Aspect 9. The energy storage device of aspect 7, wherein the first electrode material comprises a metal oxide. Tin oxide is considered suitable. $Li_4Ti_5O_{12}$ is also suitable. Other metal oxides may also be used.

Aspect 10. The energy storage device of any of aspects 1-9, wherein the first electrode material has an electrode potential (as applied to an anode) of less than about 3 V versus Li/Li+ at the fully lithiated state. Chalcogenides (e.g., $MoS_2$, $VSe_2$) are also considered suitable such materials.

Aspect 11. The energy storage device of any of aspects 1-10, wherein the alkali metal comprises lithium, sodium, or both. It should be understood that the alkali metal may be disposed on the surface of the first (or second) electrode material; e.g., as a complete or partial coating along the first electrode material.

As one example, the alkali metal may be coated along parts of one or more pores that may be present in the first electrode material. The alkali metal may be uniformly distributed within the electrode material, although this is not a requirement. For example, alkali metal may be concentration at one or more locations within the electrode material. The electrode material may also include a gradient of alkali metal concentration. The alkali metal may also be present as particulate dispersed on or even within the electrode material.

Aspect 12. The energy storage device of aspect 11, wherein the alkali metal comprises lithium.

Aspect 13. The energy storage device of any of aspects 1-12, wherein the second electrode material comprises an alkali metal.

Aspect 14. The energy storage device of aspect 13, wherein the alkali metal comprises lithium, sodium, or both.

Aspect 15. The energy storage device of aspect 14, wherein the alkali metal comprises lithium.

Aspect 16. The energy storage device of any of aspects 1-15, wherein the electrolyte is characterized as being an organic electrolyte. A solvent may comprise, e.g., ethylene carbonate, diethyl carbonate, dioxolane, TEGDME, dimethyl carbonate or their mixture. An electrolyte may also be aqueous in nature in some embodiments. An electrolyte may also comprise one or more salts. A salt in the electrolyte may comprise, e.g., $LiPF_6$, LiTFSI, $LiClO_4$, $LiBF_4$, $LiAsF_6$.

Aspect 17. The energy storage device of any of aspects 1-16, wherein the electrolyte comprises carbonate.

Aspect 18. The energy storage device of aspect 17, wherein the electrolyte comprises diacyl carbonate, ethylene carbonate, or any combination thereof.

Aspect 19. The energy storage device of any of aspects 1-18, wherein the electrolyte comprises an ether, an acetal (e.g., dioxolane), or both.

Aspect 20. The energy storage device of any of aspects 1-19, wherein at least one of the first and second electrode materials comprises an additive.

Aspect 21. The energy storage device of aspect 20, wherein the additive comprises a metal, carbon, or any combination thereof.

Aspect 22. The energy storage device of aspect 21, wherein the additive comprises carbonaceous nanoparticles, carbon nanotubes, graphite, graphene, or any combination thereof. Metallic nanoparticles are also considered suitable additives. An additive in particulate form may define a cross-sectional dimension (e.g., diameter or effective diameter) in the range of from about 1 nm to about 1 micrometer, e.g., from about 1 nm to about 1000 nm, from about 10 nm to about 900 nm, from about 50 nm to about 500 nm, from about 100 nm to about 400 nm, or even about 250 nm (and all intermediate values). Particles having a cross-sectional dimension in the range of from about 1 to about 100 nm, e.g., from about 5 to about 95 nm, from about 10 to about 90 nm, from about 15 to about 85, from about 20 to about 80 nm, from about 25 to about 75 nm, from about 30 to about 65 nm, from about 35 to about 60 nm, from about 40 to about 55 nm, or even about 50 nm.

Aspect 23. The energy storage device of any of aspects 1-22, wherein the energy storage device is characterized as having an energy density that is greater by from 10% to about 500% than the energy density of a corresponding energy storage device having electrodes that are free of alkali metal.

In some embodiments, the charge stored in the electrode alkali metal is between 0.01 mAh/cm$^2$ and 100 mAh/cm$^2$, e.g., 0.1-20 mAh/cm$^2$. In some embodiments (and without being bound to any particular range or theory), the charge stored in alkali metal may be 500%, 400%, 300%, 200%, or even 150% of the charge that can be stored in a comparative, non-alkali metal-containing anode material, e.g., graphite or Si. The foregoing is, again, relates to only some embodiments and is illustrative only and does not limit the scope of the present disclosure.

Aspect 24. An electronic device, the electronic device comprising an energy storage device according to any of aspects 1-23.

Aspect 25. The electronic device of aspect 24, wherein the energy storage device is in electronic communication with a display, a transmitter, a receiver, a motor, a memory device, a chiller, a heater, an illuminator, a controller, or any combination thereof. The disclosed energy storage devices may be incorporated into mobile devices, stationary devices, as well as into disposable devices.

Aspect 26. A workpiece, comprising: a conductive substrate; an amount of an alkali metal disposed on the conductive substrate; and an amount of a sealant surmounting the amount of alkali metal so as to at least partially seal the amount of alkali metal against the environment exterior to the amount of alkali metal.

As described elsewhere, the alkali metal may comprise lithium or sodium, in some embodiments. The alkali metal may be present in the form of a film, e.g., a film having a thickness in the range of from about 100 nm to about 100 micrometers. Films having a thickness of from about 100 nm to about 100,000 nm, from about 1000 to about 10,000 nm, or even about 1000 nm are all considered suitable.

Aspect 27. The workpiece of aspect 26, wherein the sealant comprises a polymer. Polymethylmethacylate (PMMA) is considered an especially suitable polymer for use as a sealant. PMMA, polycarbonate, PVDF, and their copolymers are considered suitable polymers, although other polymers may be used. The sealant may be present as a layer having a thickness in the range of from about 1 to about 1000 micrometers, e.g. from about 10 to about 100 micrometers, or even about 50 micrometers.

Aspect 28. The workpiece of any of aspects 26-27, wherein the sealant has disposed within an amount of a conductive material.

Aspect. 29. The workpiece of aspect 28, wherein the conductive material comprises metallic particles, carbonaceous particles, or any combination thereof.

Without being bound to any particular theory, the presence of a conductive material in the sealant may act to improve device performance. The conductive material may be present at from about 1 to about 90 wt % of the weight of the sealant and conductive material, e.g., 1, 5, 10, 15, 20, 25, 30, 35, 40, 45, 50, 55, 60, 65, 70, 75, 80, 85, or even about 90 wt %.

Aspect 30. The workpiece of aspects 26-29, further comprising an amount of a slurry surmounting the sealant, the slurry comprising a slurry solvent and an amount of electrode material dispersed within the slurry solvent. Suitable slurry solvents include water, ethanol (and other alcohols), and the like. The slurry may be one that does not dissolve the sealant materials, although the slurry may be one that dissolves active materials and binders. In some embodiments, N-methyl-2-pyrrolidone may be used as a slurry solvent, though this is not a requirement, and other slurry solvents may be used.

Aspect 31. The workpiece of aspect 30, wherein the slurry solvent is substantially non-reactive with the sealant. In some embodiments, the slurry solvent is removed so as to give rise to an amount of electrode material surmounting the sealant. Removal may be effected by heat, reduced pressure, and other methods known to those of ordinary skill in the art.

Aspect 32. The workpiece of any of aspects 26-31, further comprising an amount of electrode material surmounting the sealant.

Aspect 33. The workpiece of aspect 32, wherein the electrode material is in fluid communication with an electrolyte capable of dissolving the sealant. Some exemplary sealant-electrolyte combinations are, e.g., PMMA (sealant)—carbonate ester (electrolyte); PMMA (sealant)—dioxolane (electrolyte); PVDF (sealant)—dioxolane (electrolyte).

Aspect 34. A method of fabricating an energy storage device, comprising: disposing an amount of an alkali metal atop a conductive substrate; with a sealant, sealing the amount of alkali metal against the environment exterior to the amount of alkali meta, the sealant optionally comprising an amount of a conductive material; giving rise to an amount of a porous electrode material surmounting the sealant; and contacting the amount of electrode material with an electrolyte under such conditions that at least a portion of the sealant dissolves in the electrolyte and the alkali metal is integrated with the electrode material.

Aspect 35. The method of aspect 34, wherein the conductive substrate comprises a metal.

Aspect 36. The method of aspect 35, wherein the metal comprises copper, nickel, cobalt, tungsten, or any combination thereof.

Aspect 37. The method of any of aspects 34-36, wherein the electrode material comprises silicon, carbon, a metal, a metal oxide, sulfur, or any combination thereof.

Aspect 38. The method of aspect 37, wherein the electrode material comprises graphite, carbon nanotubes, graphene, or any combination thereof.

Aspect 39. The method of aspect 37, wherein the electrode material comprises a metal oxide.

Aspect 40. The method of any of aspects 34-39, wherein the electrode material comprises a electrochemically active material having an electrode potential of less than about 3 V versus Li/Li+.

Aspect 41. The method of any of aspects 34-40, wherein the alkali metal comprises lithium, sodium, or both.

Aspect 42. A method of fabricating an energy storage device, comprising: disposing an amount of an alkali metal atop a porous substrate, the substrate optionally being disposed between a first electrode material and a second electrode material; with a sealant, sealing the amount of alkali metal against the environment exterior to the amount of alkali metal; and contacting the amount of electrode material with an electrolyte under such conditions that at least a portion of the sealant dissolves in the electrolyte and the alkali metal is integrated with the first electrode material, the second electrode material, or both.

Aspect 43. A workpiece, comprising: a porous substrate; an amount of an alkali metal disposed on the conductive substrate; and an amount of a sealant surmounting the amount of alkali metal so as to at least partially seal the amount of alkali metal against the environment exterior to the amount of alkali metal.

Aspect 44. The workpiece of aspect 43, wherein the sealant comprises a polymer.

Aspect 45. The workpiece of any of aspects 43-44, wherein the sealant has disposed within an amount of a conductive material.

Aspect 46. The workpiece of aspect 45, wherein the conductive material comprises metallic particles, carbonaceous particles, or any combination thereof.

Aspect 47. The workpiece of any of aspects 43-46, further comprising first and second electrode materials, the porous substrate being disposed between the first and second electrode materials.

Aspect 48. The workpiece of aspect 4, further comprising an amount of an electrolyte in contact with the alkali metal.

Exemplary Embodiments

Figure 5:
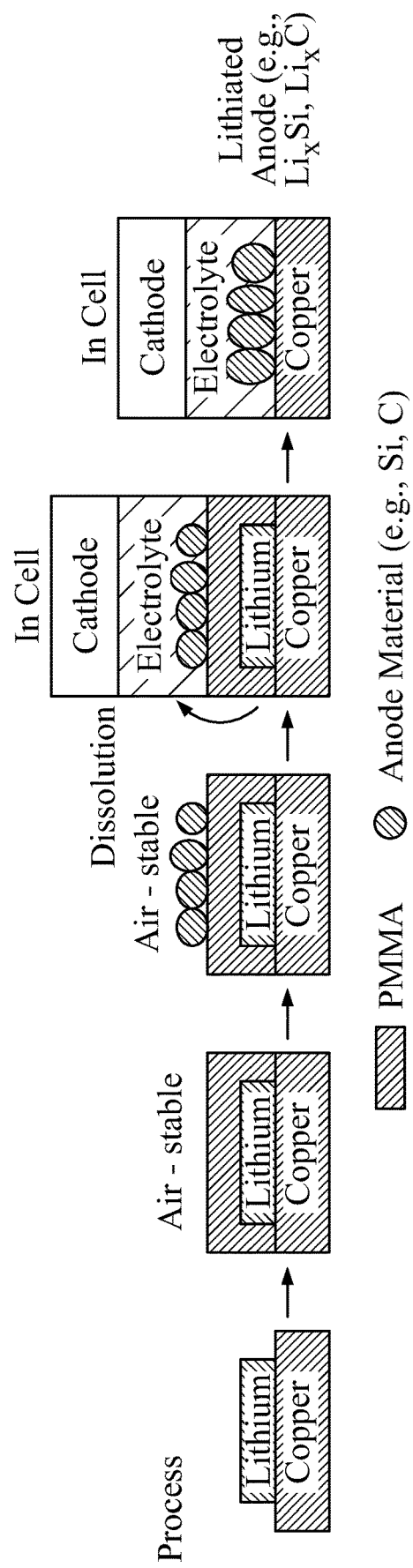
FIG. 5 depicts an exemplary fabrication process for anodes devices according to the present disclosure.

In one exemplary embodiment of the present disclosure, a user may perform the following fabrication steps, which steps are depicted in FIG. 1 and FIG. 5:

1. Deposit a coating of a polymer sealant (e.g., PMMA, Polymer A; optionally including a conductive material, which may be in particle form) onto a metallic lithium film, which is on a metal substrate, such as Cu and/or Ni. The polymer acts as a barrier layer to protect the lithium from air and moisture. In some embodiments, when present, the conductive material does not react with the alkali metal (e.g., lithium). When present (and as described elsewhere herein), the conductive particles form good electrical contact with electrode materials after the sealant is dissolved, as described elsewhere herein.

2. Deposit one or more air-stable negative electrode materials (e.g., carbon, silicon, graphite, tin, metal oxides) on the polymer. The deposition may be a standard slurry coating used in battery fabrication with solvent B (e.g., ethanol, water). It is preferred—though not required—that Polymer A is not soluble in solvent B.

3. Assembly with a separator and a positive electrode to make a battery. Cylindrical cells or coin cells are both considered suitable battery configurations, and the present technology may be applied to these and other battery configurations.

4. Adding electrolyte. Polymer A is suitably soluble in the electrolyte, and the lithium then reacts with the negative electrode to form a lithiated anode.

It should be understood that the disclosed technology is not limited to the materials described above. As one example, the disclosed methods may be applied to sodiated negative electrodes in Na-ion batteries.

Further reference is now made to the attached FIGs, which FIGs are illustrative only and do not limit the scope of the present disclosure.

FIG. 1 presents an exemplary fabrication process for devices according to the present disclosure. As shown in FIG. 1, a user may first dispose an amount of alkali metal (e.g., Li) atop a conductive substrate, in this instance copper. It should be understood that the alkali metal may be adhered, bonded to, or otherwise pressed against the substrate. In some cases, pressure may be applied against the alkali metal by the electrolyte. The user may then apply an amount of sealant (e.g., a polymer such as PMMA or PVDF) so as to at least partially seal the alkali metal against the environment exterior to the alkali metal. The sealant is suitably a material that is air-stable.

A user may then apply a slurry (or other dispersion) to the sealant. The slurry suitably includes a slurry solvent in which an electrode material (e.g., graphite) is dispersed. The user may then process the slurry (e.g., heating, reduced pressure) so as to remove at least a portion of the slurry and to leave behind the electrode material. This may be performed so as to give rise to a cohesive layer or other formation of the electrode material. The electrode material is suitably porous or otherwise pervious. The user may select the solvent such that the solvent does not dissolve the sealant.

The user may then contact the electrode material with an electrolyte, suitably so as to form a battery or other energy storage device or cell. Suitable electrolytes are described elsewhere herein; an electrolyte may be one that dissolve the sealant. The dissolution of the sealant then gives rise to integration of the alkali metal with the electrode material, which, in the case of FIG. 1, is a lithiated graphite.

Figure 2:
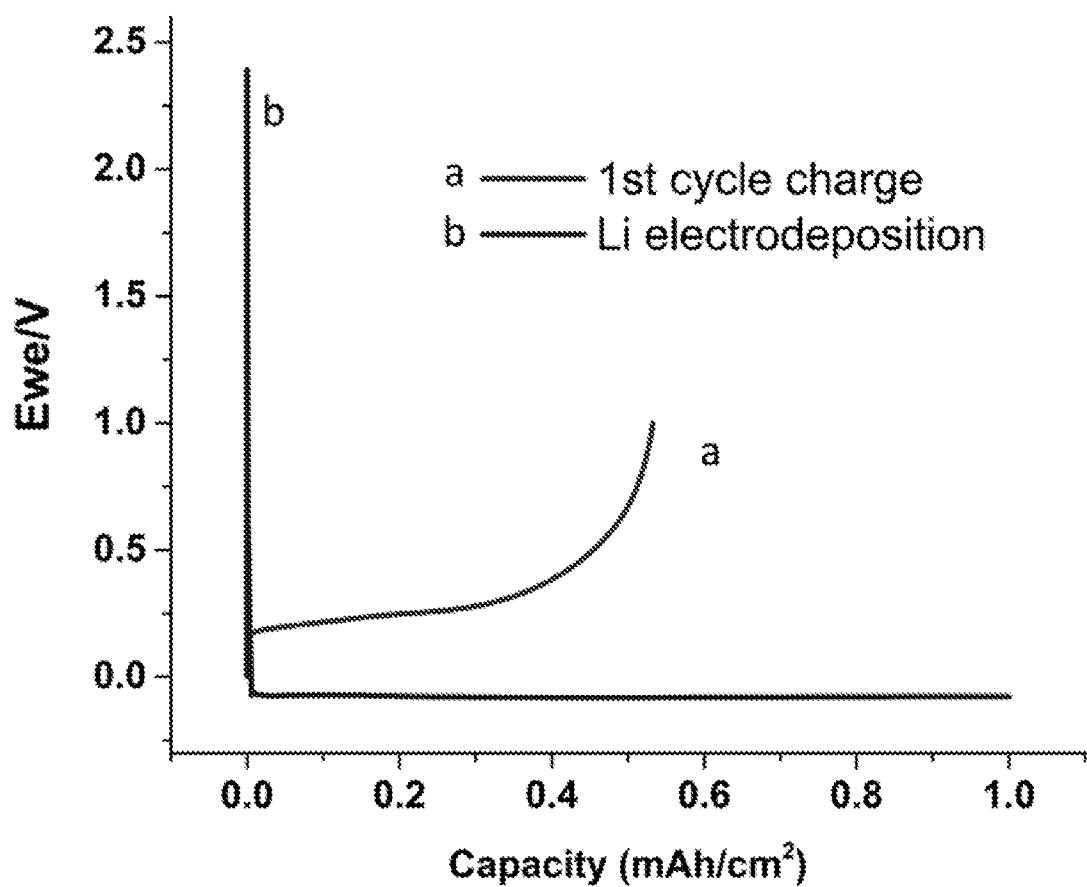
FIG. 2 illustrates exemplary capacity data showing that lithium may be taken out of lithiated graphite, indicating that the processed graphite is active—line (b) is the voltage-capacity curve of depositing lithium onto copper substrate, and line (a) is the voltage-capacity curve of stripping lithium from the copper substrate.

FIG. 2 provides Ewe/V vs. capacity date for an exemplary device. As shown in the FIG., lithium may be taken out of the graphite, which in turn demonstrates that the graphite is active.

Figure 3:
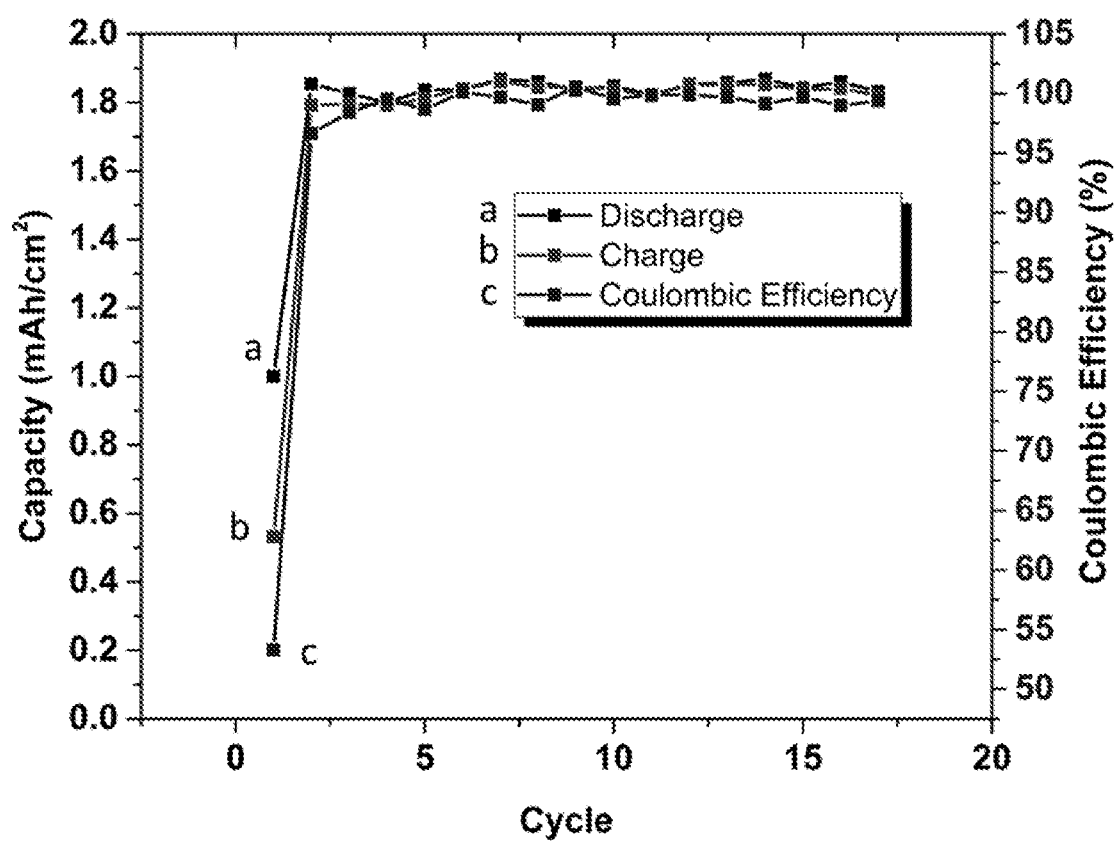
FIG. 3 illustrates discharge (line a), charge (line b), and Columbic Efficiency (line c) for an exemplary device according to the present disclosure over 17 cycles.

FIG. 3 provides capacity and Coulombic Efficiency data for an exemplary device over 17 cycles. As the FIG. shows, the exemplary device exhibited excellent and consistent charge, discharge, and Coulombic Efficiency over these 17 cycles.

Figure 4:
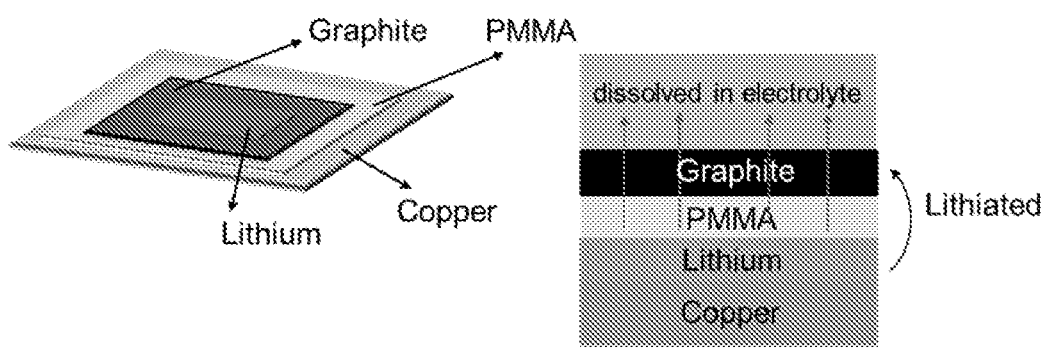
FIG. 4 depicts an exemplary device according to the present disclosure.

FIG. 4 depicts an exemplary device according to the present disclosure. As shown in the FIG., a device suitably includes an alkali metal (e.g., Li) disposed atop a conductive substrate (e.g., Cu). A sealant (PMMA polymer; PC and PVDF are also suitable) is disposed between the electrode material (graphite) and the sealant. Upon exposure to an electrolyte that dissolves the PMMA, the alkali metal is integrated with the graphite to give rise to a lithiated graphite negative electrode.

FIG. 5 provides a further depiction of an exemplary process. As shown in that FIG., the alkali metal (Li) may be encased or otherwise sealed by a sealant, such as PMMA or other polymers, and the result is an air-stable assembly. The user may then add an electrode (anode) material, such as Si, Sn, or C onto the sealant, this giving rise to an air-stable assembly. The assembly may then be placed into a cell (with a cathode).

The user may then introduce an electrolyte such that the sealant dissolves into the electrolyte and integrates with the anode electrode (anode) material, thus giving rise to an electrode (anode) material that is integrated with the alkali metal.

Figure 6:
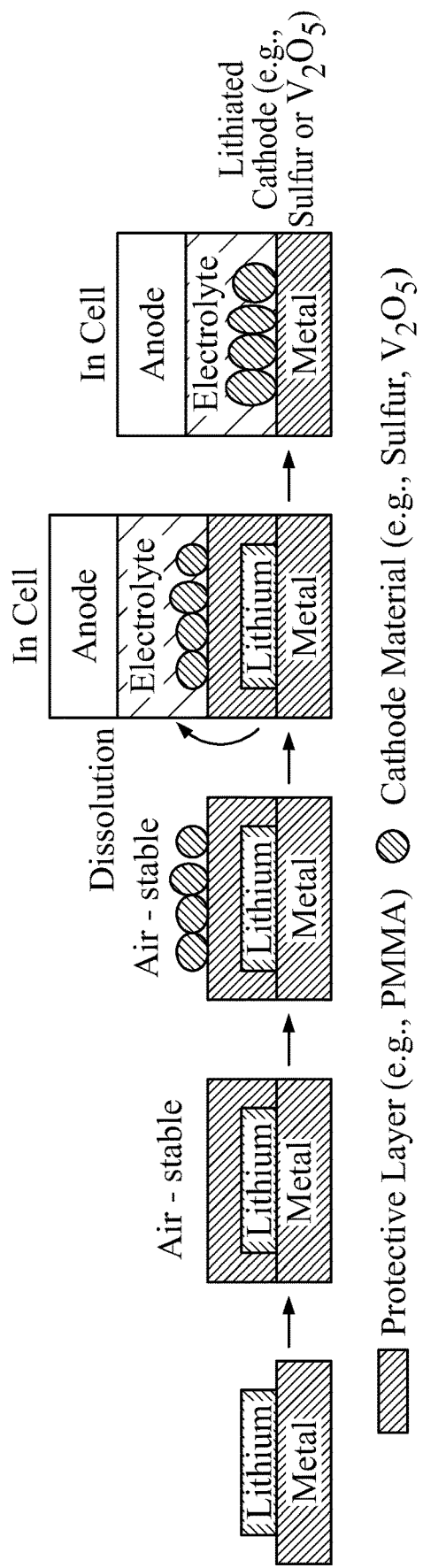
FIG. 6 depicts an exemplary fabrication process for cathodes according to the present disclosure.

FIG. 6 provides an alternative view of the disclosed processes. As shown in that FIG., a user may place an alkali metal (e.g., Li) atop a conductive substrate, such as a metal. The alkali metal is then encased with a sealant, such as PMMA or other polymers, and the result is an air-stable assembly. The user may then add an electrode (cathode) material, such as S or $V_xO_y$ onto the sealant, this giving rise to an air-stable assembly. The electrode material may initially be provided in a solvent/slurry, and the solvent may then be removed.

The user may then introduce an electrolyte such that the sealant dissolves into the electrolyte, thus giving rise to an electrode (cathode) material that is integrated with the alkali metal.

Although not shown, the embodiments shown in FIG. 5 and FIG. 6 may be combined. Such a combination allows the user to give rise to a device having two electrodes, each of which two electrodes comprises alkali metal.

Figure 7:
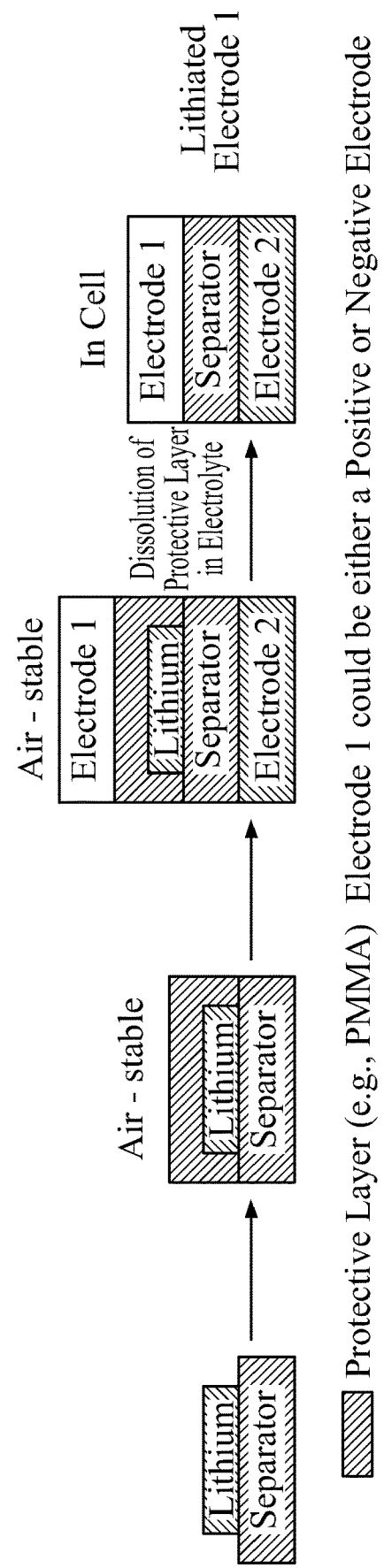
FIG. 7 provides an exemplary fabrication process according to the present disclosure.

FIG. 7 provides a further alternative embodiment of the disclosed technology. As shown in the FIG., a user may dispose an alkali metal atop a separator, e.g., a porous material. Polymers such a polyethylene and polyimide are considered particularly suitable separator materials.

Again with reference to FIG. 7, after disposition of the alkali metal on the separator, the user may—as described elsewhere herein—apply a sealant to the alkali metal so as to seal the alkali metal against the environment exterior to the alkali metal. The sealed alkali metal-separator assembly may then be positioned between first and second electrode materials. A user may then introduce an electrolyte under such conditions so as to dissolve at least part of the sealant and integrate the alkali metal into the first, second or both electrode materials. The alkali metal may be disposed on one or both sides of the separator; the user may elect to dispose the alkali metal on the side of the separator that faces the electrode into which the user wishes to incorporate the alkali metal.

Additional Disclosure

The following additional disclosure is illustrative only and does not limit the scope of the present disclosure.

As is known in the art, a common challenge in battery anodes is the formation of solid electrolyte interphase (SEI) in the initial cycle, which consumes a significant portion of active lithium ions. This problem is more severe in nano-structured anodes with high specific capacity, such as Si and Sn, due to their high surface area and large volume change.

Although prelithiation approaches may be seen as an approach to address such losses, the stability of prelithiation reagents is a concern due to their low potential and high chemical reactivity towards $O_2$ and moisture, as only very limited amounts of prelithiation agents could survive in ambient air.

As explained elsewhere herein, the present disclosure provides, in one embodiment, layered structure of active material/polymer/lithium anode, which is stable in ambient air (10-30% relative humidity) for a period that allows manufacturing. The polymer layer protects lithium against $O_2$ and moisture, and it is also stable in coating active materials. The polymer layer may be gradually dissolved in battery electrolyte, and active materials contact with the lithium to form a lithiated anode. This layered-structure electrode not only renders electrodes stable in ambient air, but also leads to uniform lithiation.

Further, the degree of prelithiation could vary from compensating for SEI to a fully lithiated anode. The disclosed strategy has achieved a high initial coulombic efficiency of 99.7% in graphite anode, and over 100% in silicon nanoparticles anode. The cycling performance of lithiated anodes was also comparable or better than non-lithiated anodes. Also demonstrated were $Li_4Ti_5O_{12}$/lithiated graphite full cells with stable cycling performance. The reported trilayer structure represents a new prelithiation method to enhance performance of Li-ion batteries.

Rechargeable Li-ion batteries (LIBs) with high energy density are attractive for applications ranging from portable electronics to electric vehicle and grid-level energy storage. State-of-the-art LIBs are produced in the discharged state as electrode materials are air-stable in such state. However, a considerable amount of active $Li^+$ ions is lost in the initial charge due to the formation of solid electrolyte interphase (SEI) on the anode surface, which results in a low initial coulombic efficiency and lowers the energy density of full cells. Such loss can be 5-20% of total available capacity in commercial graphite electrodes, and it could reach 15-50% for next-generation anode materials with high capacity (e.g. Si and Sn), as these materials have large volume expansion and high surface area, especially when nanostructured electrodes are used to improve cycling performance and power capability. The high initial loss of Li reduces achievable capacity in a full cell and thus compromises the gain in energy density and cycling life of these nanostructured electrodes. Accordingly, there is a strong motivation to prelithiate anode to compensate the Li loss during SEI formation.

Although various methods have been tried to prepare lithiated anodes, many lithium-rich additives and protected lithium particles are not stable in ambient air with relative humidity (RH) above dry room levels. Moreover, the addition of lithiated particles with existing methods can lead to inhomogeneity in active electrode materials and current distribution, and consequently promote dendrite formation.

To address these issues, the present disclosure provides methods for preparing ambient air-stable lithiated electrodes with uniform or near-uniform distribution of lithium sources. The disclosed electrode may be stable in air with RH of 10-30% for over 60 min, which in turn permits manufacturing at large scale. Moreover, because the protective layer (sealant) in the disclosed design is readily soluble in the electrolyte, there are minimal excess inactive materials that stay in the battery and reduce battery energy density. In addition, the amount of lithium in the anode is easily tuned from simply compensating for SEI to fully lithiating all electrode materials through controlling the thickness of the lithium layer. The latter case can allow such lithiated anode to pair with high capacity Li-free cathode materials (e.g. S, $O_2$) to further improve the energy density of LIBs.

One exemplary strategy is illustrated in FIG. 1. First, lithium deposited on Cu foil is coated with a protective polymer layer to render it ambient air-stable. Next, anode materials (e.g., graphite, Si) are coated onto the polymer with a solvent that does not dissolve it. Because metallic lithium and anode materials are separated by the polymer layer, the tri-layer anode is stable in ambient air.

The anode may then be integrated with conventional cathode materials to form a battery, followed by injection of battery electrolyte. Because the polymer coating layer (e.g. Poly(methyl methacrylate), PMMA) is selected to be soluble in the battery electrolyte (e.g., a carbonate-based electrolyte), the anode materials in the cell are placed into contact with lithium as a result of pressure inside the cell, and become a lithiated anode. In this process, both metallic lithium and the lithiated anode are never exposed to air; and thus the process can survive in ambient air environment. Furthermore, the lithiation is uniform as the lithium film distributes evenly on the copper substrate. The process may include a sealant (polymer) that is insoluble in the anode slurry solution but soluble in the battery electrolyte. PMMA is one exemplary polymer, as it is readily soluble in carbonate-based electrolyte with a solubility over 20 wt %, but insoluble in ethanol and water, which are widely studied and used in commercial processes for coating anode materials. (PMMA is widely used in gel electrolytes and is compatible with the electrochemical environment in Li-ion batteries.) An impedance measurement shows that even with 20% PMMA, the battery electrolyte still has an ionic conductivity of 1.7 mS/cm at room temperature, which is a reasonable value for Li-ion batteries. In this example graphite and silicon in ethanol with polyacrylic acid (PAA) binder are used as the coating slurry, and the compatibility of PMMA-coated lithium with water is also discussed.

Figure 8A:
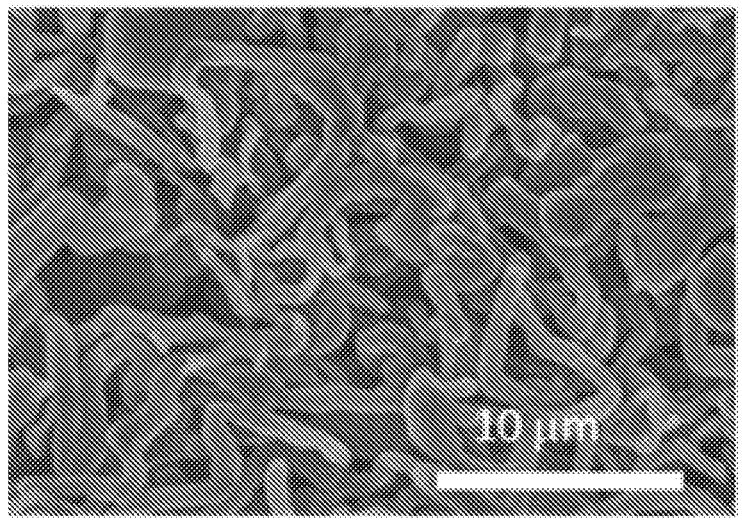
FIGS. 8A (top view) and 8B (cross view) provide SEM characterizations and camera images of graphite/PMMA/lithium electrode, FIG. 8C provides a top view of PMMA-coated lithium, FIG. 8D provides a 45 degree side view of graphite/PMMA/Li on copper, and FIG. 8E provides camera images of PMMA-coated lithium exposed to air with relative humidity of 30% for various time, and lithium without PMMA coating.
Figure 8B:
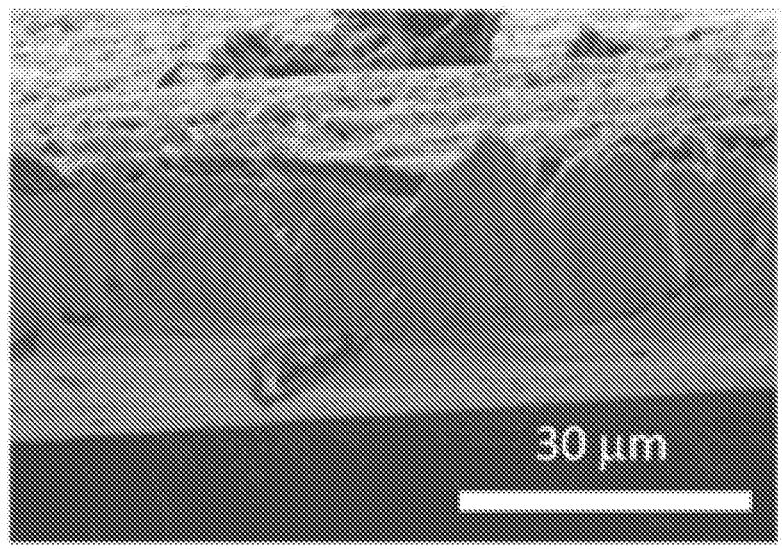

To prepare an exemplary graphite/PMMA/Li trilayer structure, lithium was electrochemically deposited on copper from 1 M lithium bis(trifluoromethane)sulfonimide (LiTFSI) in 1,3-dioxolane (DOL) with 1 wt % $LiNO_3$, which shows a fiber-like structure (FIG. 8A). A cross-sectional view (FIG. 8B) indicates that the thickness is about 20 μm for 2 mAh $Li/cm^2$.

Figure 8C:
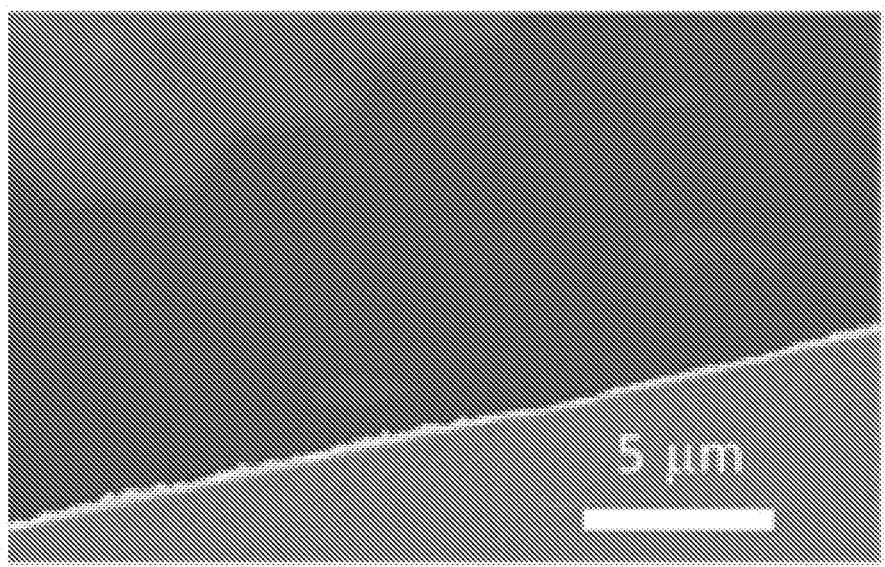
Figure 8D:
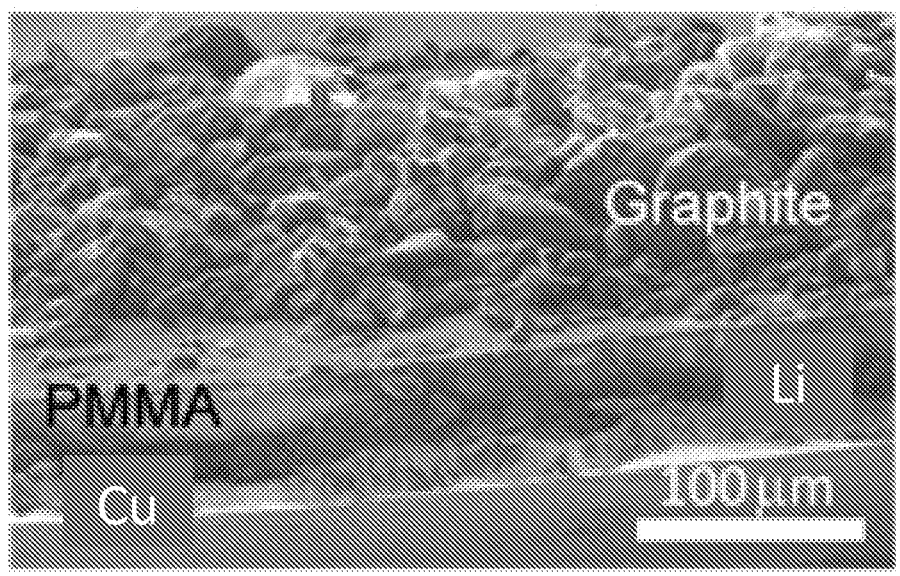

Next, 20 μL 10 wt % PMMA in DOL was drop cast onto the lithium electrode inside a glove box. After DOL was evaporated, a uniform PMMA coating layer with a thickness of 20 μm was obtained (FIG. 8C). The coating fully covered the lithium, so the lithium layer cannot be seen in this top view SEM image. The white line in FIG. 8C is the edge of the electrode. The sample was removed from the glovebox and artificial graphite/PAA (90:10 in weight) in ethanol was drop cast onto PMMA-coated lithium, which resulted in a trilayer structure of a black graphite layer on PMMA and lithium (FIG. 8D).

Figure 8E:
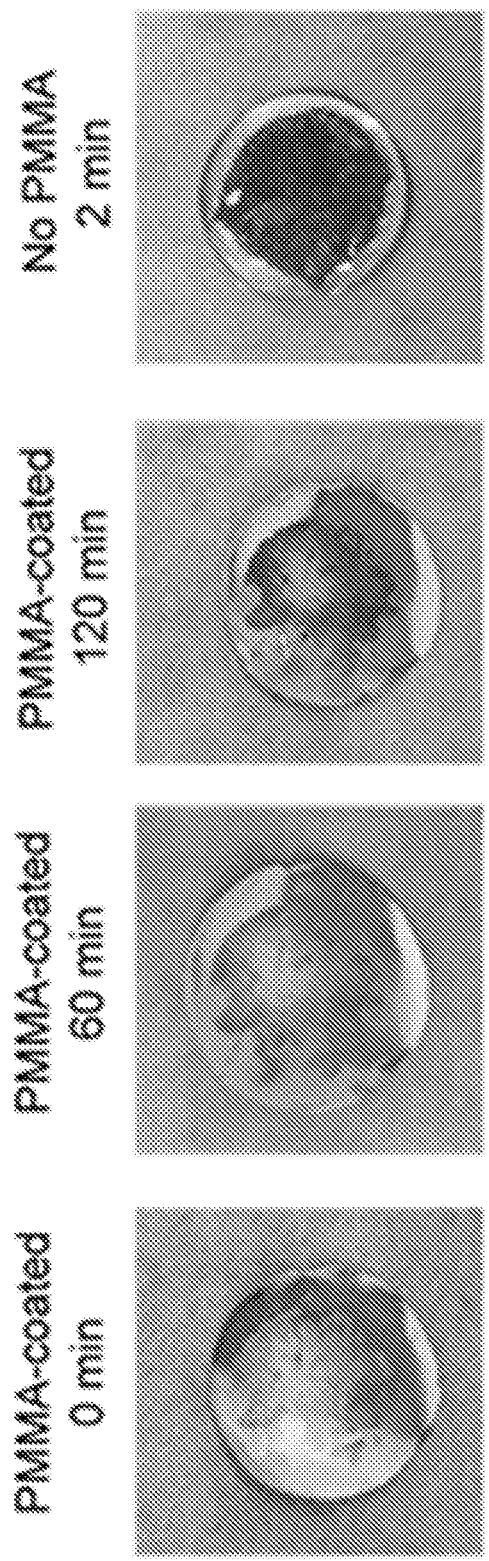

To test the stability of the sample in ambient air, the PMMA-coated lithium film was exposed to air with relative humidity (RH) of 30% for various times. As seen in FIG. 8E, the color of lithium remained largely white after 1 hour, but darkened after 2 hours, suggesting that it was stable in air for ~1 hour. In contrast, lithium film not protected by PMMA became dark after only 2 min in ambient air. This demonstrates PMMA's resistance to $O_2$ and $H_2O$ to react with lithium and ability to act as a robust protecting layer to allow the slurry coating of anode and following fabrication steps in battery industry.

Figure 9A:
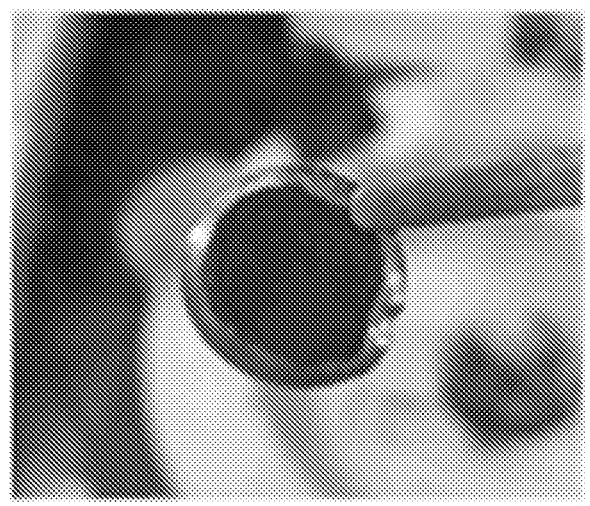
FIG. 9A provides a camera image of a graphite/PMMA/Li trilayer electrode before being soaked in battery electrolyte for 24 hours and after (FIG. 9B) the soaking, FIG. 9C provides XRD patterns of lithiated artificial graphite with various loading. The lithiated graphite was made by sealing graphite/PMMA/lithium electrode with battery electrolyte (1M LiPF6 in EC/DEC) in a coin cell for 24 hours, and XRD and color evolution indicate that lithium could be released into the graphite anode in such graphite/PMMA/Li trilayer electrode.
Figure 9B:
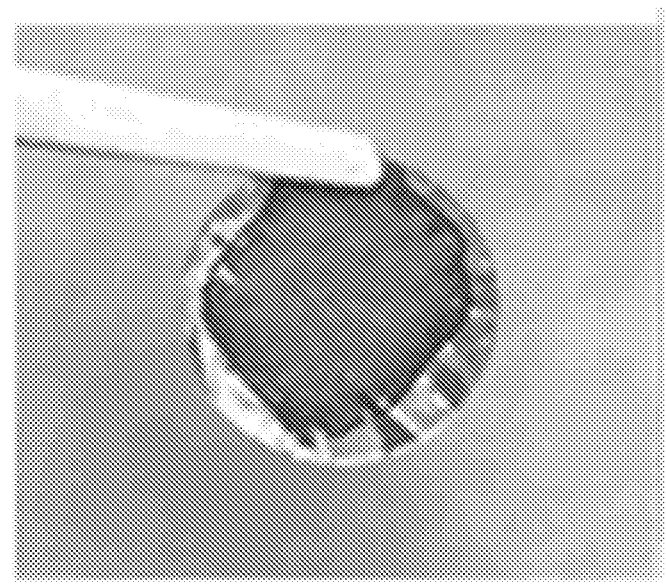

To evaluate that lithium can react with graphite when PMMA is dissolved, the graphite/PMMA/Li trilayer structure was soaked in an exemplary battery electrolyte (1M $LiPF_6$ in EC/DEC) inside a coin cell. The amount of electrodeposited lithium was 1 mAh while the mass of graphite was 1 mg. After aging for 24 hours, the cell was opened and the graphite electrode appeared golden instead of black, which was the characteristic color of $LiC_6$ (FIG. 9B).

Figure 9C:
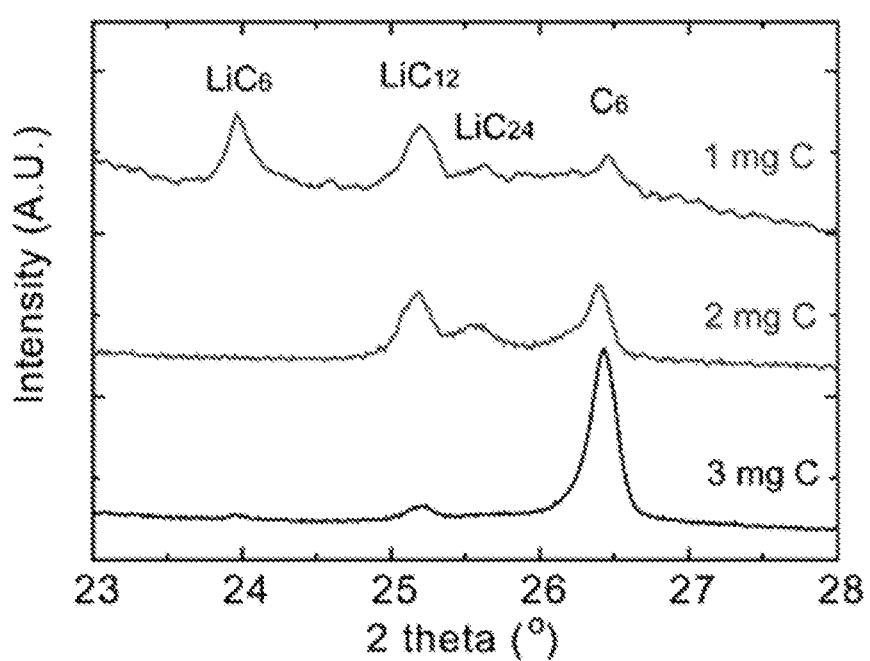

To further prove the formation of lithiated graphite, X-ray diffraction patterns of graphite/PMMA/Li with various graphite loading were taken. When the ratio of graphite to lithium is 3 mg/1 mAh, graphite peak was still strong as the deposited lithium was not enough to fully lithiate graphite (bottom line in FIG. 9C). However, when the ratio was lowered to 1 mg/1 mAh (top line in FIG. 9C), graphite peaks almost disappeared, and only $LiC_6$ and $LiC_{12}$ existed in the electrode, indicating that lithium was incorporated into graphite to form lithiated graphite electrode.

Next, the performance of this trilayer structure in ambient air was evaluated by electrochemical tests. In the test, electrochemically deposited lithium with a nominal capacity of 2 $mAh/cm^2$ was covered with PMMA and 3-4 $mg/cm^2$ artificial graphite in sequence. Such graphite/PMMA/Li electrode was first exposed to air with fixed humidity for a certain period. Then the exposed electrode was delithiated in a half cell with Li metal counter electrode, so that the amount of active lithium remained in the lithiated graphite electrode can be determined.

Figure 10A:
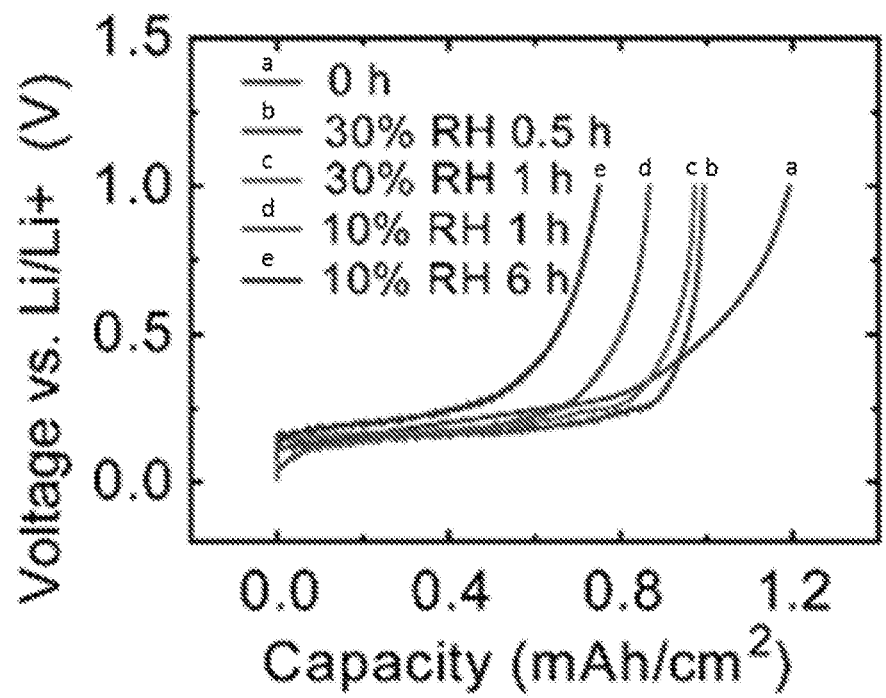
FIG. 10A provides the effect of exposure to ambient air on the amount of active lithium in graphite/PMMA/Li electrode for delithiation from the graphite/PMMA/Li electrode in a half cell with lithium metal as the counter electrode, different curves correspond to exposure to air for various time, the curves match the voltage profile of graphite electrode (curves listed from top to bottom are shown right to left, respectively), and FIG. 10B provides the amount of active lithium extracted in the first delithiation versus time exposed to air—the capacity retention is normalized to the delithiated capacity without exposure.

As shown in FIG. 10A, when the electrode was not exposed to air at all, 1.18 $mAh/cm^2$ of lithium could be extracted from lithiated graphite. After exposure to 30% RH for 30 min and 60 min, the amount of Li extracted were 1.00 and 0.86 $mAh/cm^2$, respectively, which were 85% and 73% of that without exposure. Similarly, 0.98 and 0.78 $mAh/cm^2$ of Li remained active under exposing to 10% RH air for 1 hour and 6 hours, respectively, which corresponded to 83% and 66% of that without exposure. These observations suggest that a PMMA coating without any particular optimization is effective to protect lithium for a period of ~60 min or longer in ambient air, which allows manufacturing at large scale. It should be noted that the lithiation depth also corresponds to 250-300 mAh/g graphite in these cells, which means that such trilayer electrode structure can not only compensates lithium loss in SEI, but also stores a significant amount of active lithium to be paired with lithium-free cathodes. To the extent there may be lithium loss, the effect of that loss is minimal, as Li has an ultrahigh specific capacity of 3860 mAh/g and thus the amount of Li needed is very small.

Figure 14A:
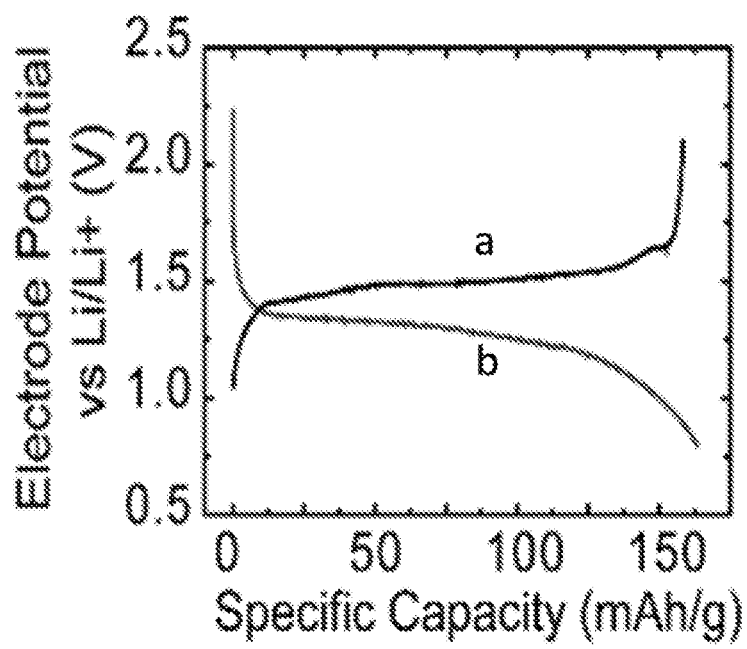
FIG. 14A illustrates electrochemical performance of $Li_4Ti_5O_{12}$/graphite/PMMA/Li full cell with a voltage profile at a current rate of C/10 based on capacity of graphite (line (b) represents the discharge voltage profile of $Li_4Ti_5O_{12}$/lithiated graphite, and line (a) represents the charge voltage profile of $Li_4Ti_5O_{12}$/lithiated graphite), and FIG. 14B provides the corresponding cycle life and coulombic efficiency (line (a) is the dependence of specific capacity over cycle number and line (b) is the coulombic efficiency (discharge capacity/charge capacity in each cycle))
Figure 14B:
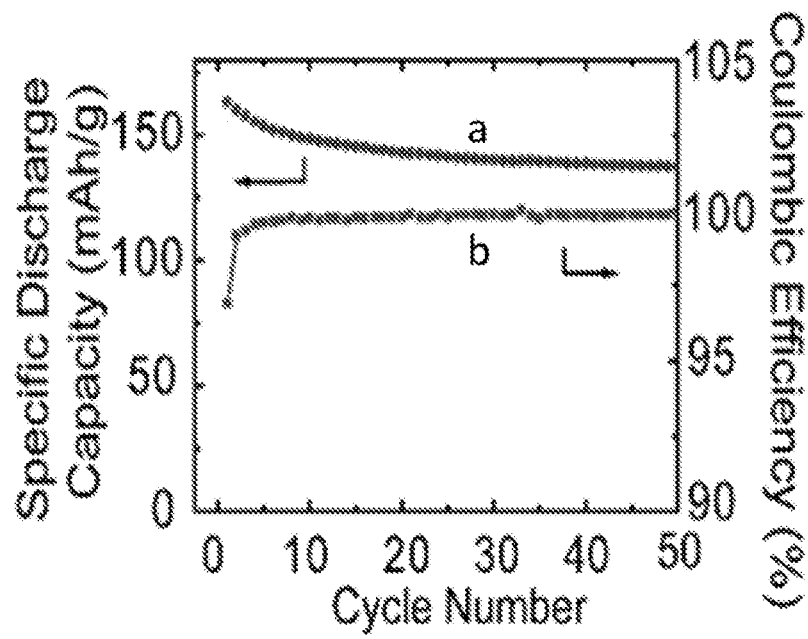
Figure 15A:
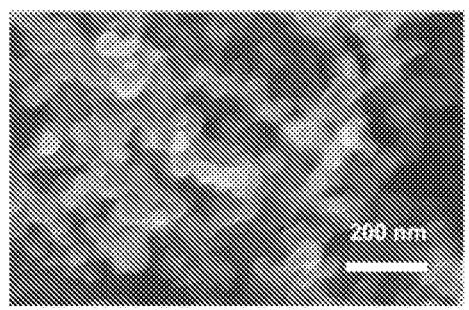
FIGS. 15A and 15C provides SEM images of bare silicon nanoparticle electrodes, and FIG. 15B and FIG. 15D provide images of Si/PMMA/lithium electrodes after sealing in cell, PMMA dissolution and prelithiation—after prelithiation, the particle size becomes larger due to expansion and SEI formation.
Figure 15B:
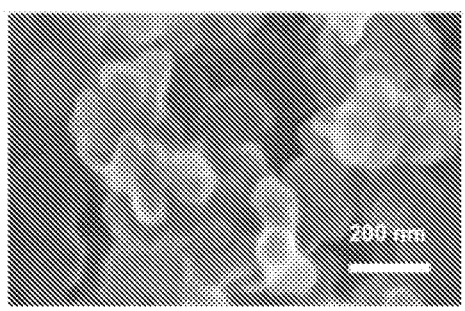
Figure 15C:
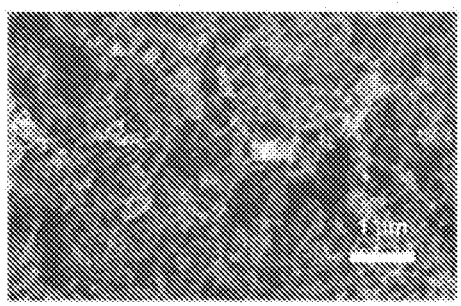
Figure 15D:
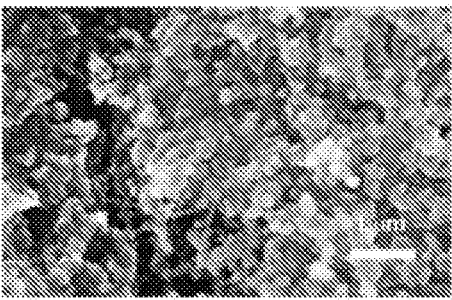

Followed by the initial delithiation, the graphite/PMMA/Li lithiated graphite electrode was further cycled at C/10 (1 C=372 mA/g). This rate was chosen as coulombic efficiency is typically low at a low current rate. FIG. 14A shows the charge/discharge voltage curve in the first cycle after the initial delithiation in FIG. 10. (The delithiation of the anode is defined as discharge, so the description is consistent with full cell.)

Figure 11:
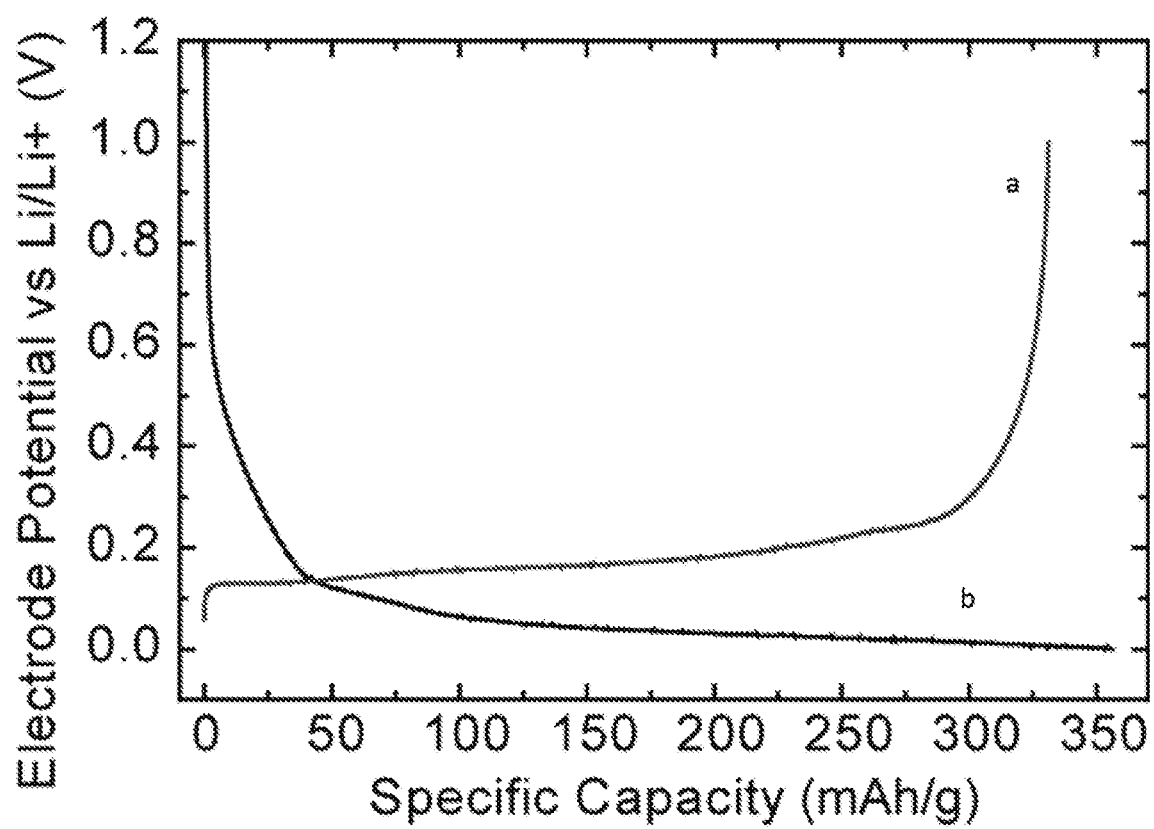
FIG. 11 provides a voltage profile of the first cycle of an artificial graphite/Li cell—the composition of artificial graphite electrode is 90% graphite and 10% PAA binder—the electrolyte is 1 M LiPF6 in EC/DEC and the corresponding coulombic efficiency is 92% (line (a) represents the discharge curve of graphite electrode and line (b) represents the charging voltage curve)

Compared to bare artificial graphite (AG) with an initial coulombic efficiency of 92% (FIG. 11), the graphite/PMMA/Li samples show high initial coulombic efficiency of 99.7% and 99.0% for exposing to 30% RH air for 30 min and 10% RH air for 60 min, respectively. This indicates a high-quality SEI layer formed during the initial lithiation process, so that there is no further loss of lithium to form SEI on graphite. The charge/discharge capacity is also comparable to bare AG. For samples exposed to 30% RH air for 30 min and 0% RH air for 60 min, discharge specific capacity reached 318 and 328 mAh/g, respectively, which were close to 331 mAh/g of bare AG.

Figure 12A:
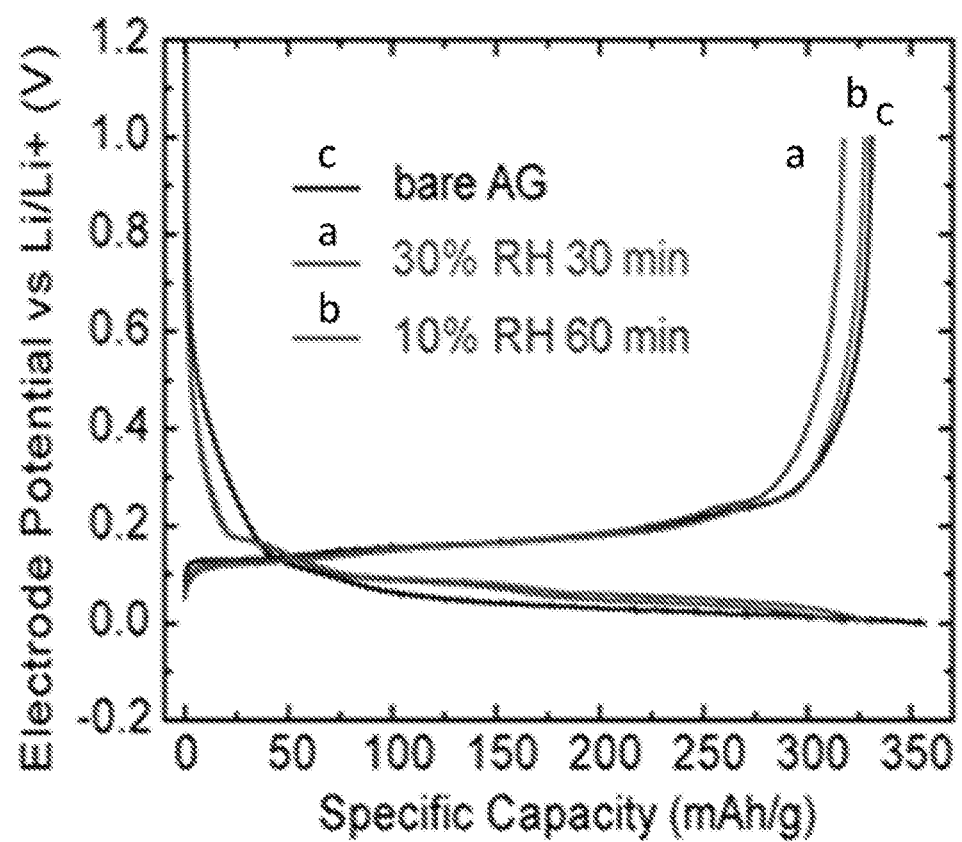
FIG. 12A illustrates electrochemical performance of the graphite/PMMA/Li structure for voltage profiles in the first charge/discharge cycle—for graphite/PMMA/Li, they correspond to the first charge/discharge cycle after the first delithiation in FIG. 10A.
Figure 12B:
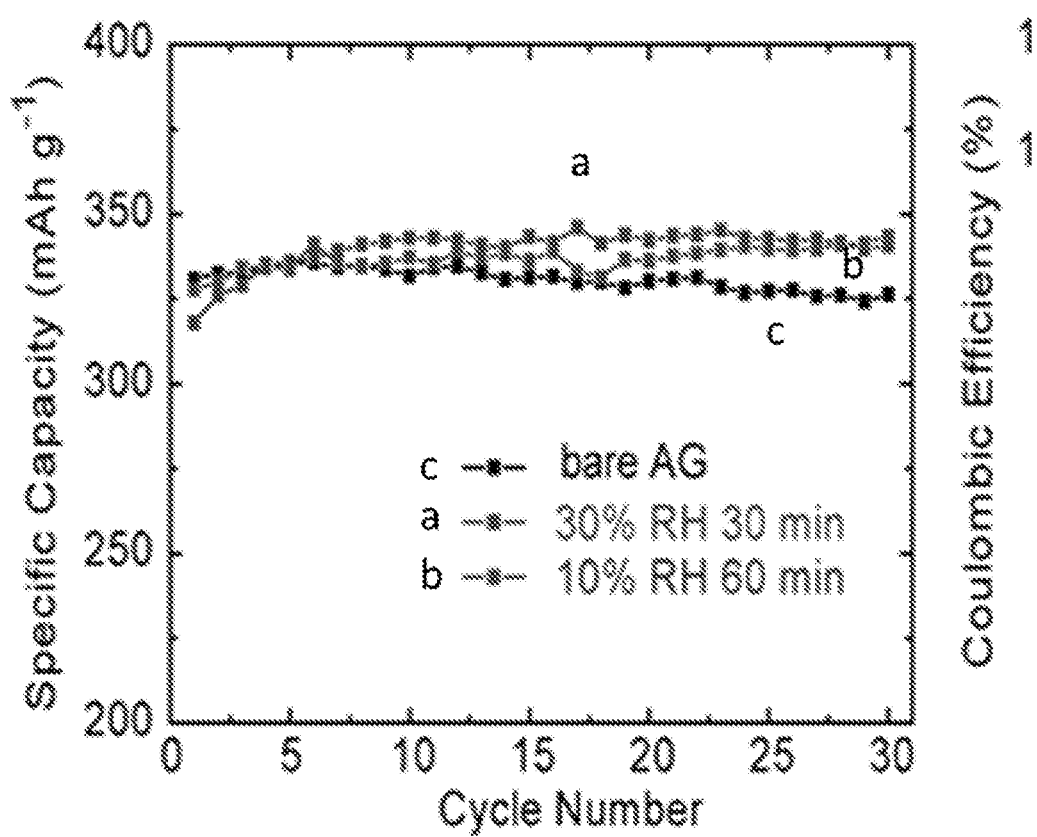
FIG. 12B provides cycling performance at C/10 (37.2 mA/g) for bare artificial graphite and after exposing to air for various time, and FIG. 12 C provides coulombic efficiency of graphite/PMMA/lithium structure and bare AG—the initial coulombic efficiencies reach 99.7% and 99.0% for exposing to 30% RH for 30 min and 10% RH for 60 min.
Figure 12C:
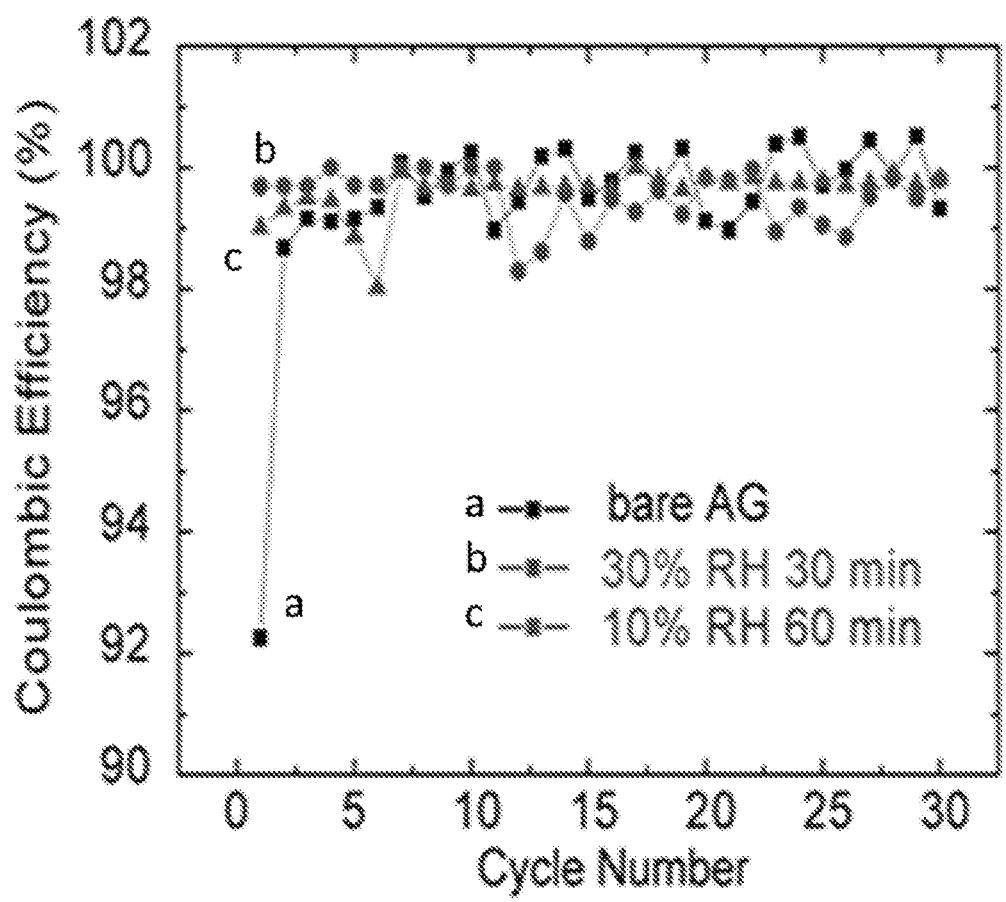

The exposure to ambient air also did not affect the cycling performance (FIG. 12B). The specific capacity is stable for 30 cycles without noticeable decay, which is similar to bare AG. For example, for 30 min under 30% RH and 60 min under 10% RH, the discharge capacities reached 340 and 330 mAh/g after 30 cycles, respectively. Without being bound to any particular theory, the increasing capacity may be a result of better electrolyte wetting and redistribution of PMMA in the electrolyte. Meanwhile, the specific discharge capacity is 327 mAh/g after 30 cycles for bare AG. The average coulombic efficiency over the 30 cycles are as high as 99.62 and 99.71% for 30 min under 30% RH and 60 min under 10% RH, respectively, which are comparable to 99.77% for bare AG. These results show that the cycling performance AG/PMMA/lithium electrodes are as stable as bare AG.

he disclosed technology was also tested with silicon nanoparticles (NPs). Silicon nanostructures could reduce capacity loss due to volume expansion of Si, but the large surface area leads to significant amount of SEI; and thus the initial coulombic efficiency is typically as low as 70-80%. Therefore, prelithiation is attractive to compensate lithium loss in SEI. To evaluate this, Si nanoparticles (<80 nm, US research nanomaterials) were dispersed in ethanol together with 15 wt % of carbon black and 15 wt % PAA binder, followed by coating onto PMMA-protected Li electrode outside a glovebox. In such an electrode, the mass loading was 0.4-0.6 mg $Si/cm^2$ and the predeposited lithium on copper was 1.0 $mAh/cm^2$. The electrode was pressed at 2 MPa for 1 min so that Si nanoparticles in the electrode formed a better connected network, but the direct contact between Si nanoparticles and lithium was avoided. SEM images show that after PMMA dissolution and lithiation of Si nanoparticles, the particle size grew from ~50 nm to ~100 nm, which is evidence for prelithiation and SEI formation (FIG. 15).

Figure 13A:
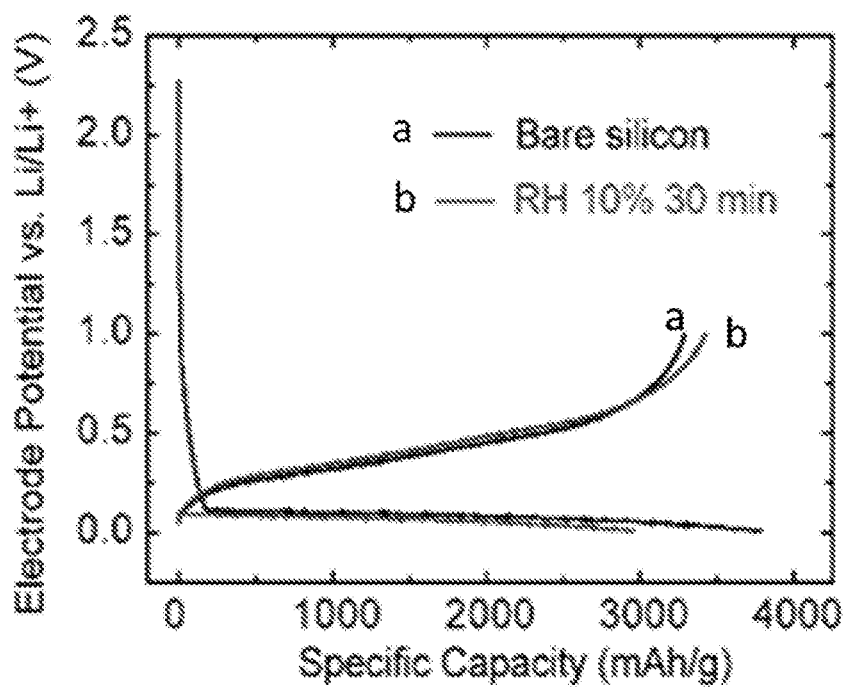
FIG. 13A illustrates electrochemical performance of a Si nanoparticles/PMMA/lithium electrode for the voltage profile of the first charge/discharge cycle of Si NP/PMMA/Li electrode and a bare Si electrode at C/20, the Si NP/PMMA/Li electrode has less charge capacity than discharge capacity as lithium is incorporated into silicon during the lithiation process in cell, FIG. 13B provides specific capacity and FIG. 13C provides cycling performance of bare Si NP electrodes, Si NP/PMMA/Li electrode exposed to 10% RH air for 30 min, and Si NP/PMMA/Li electrode not exposed to air—the cycling is performed at C/2, except that the first two cycles are at C/20.
Figure 13B:
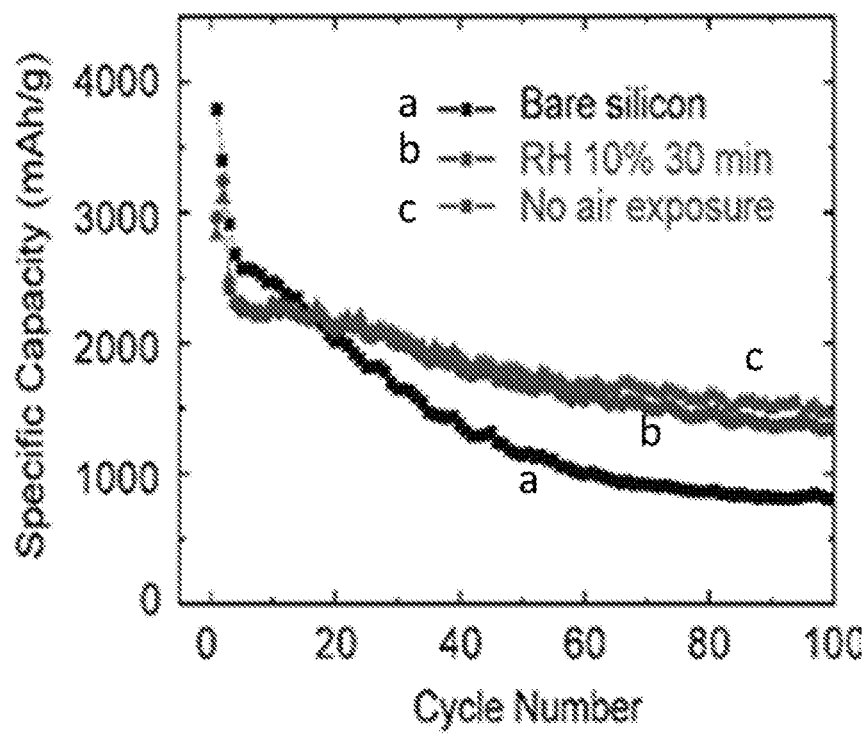
Figure 13C:
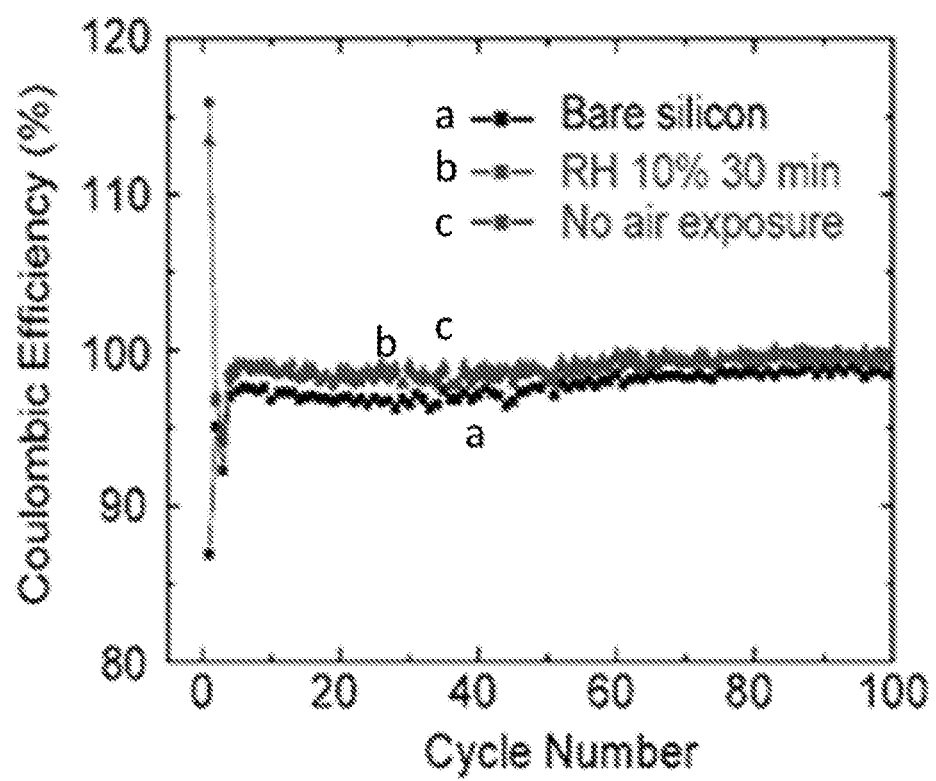

The electrochemical performance of the Si/PMMA/Li electrode and bare Si NPs are shown in FIG. 13. The bare Si NP electrode only has an initial coulombic efficiency of 87% at C/20 (1 C=4000 mA/g), indicating that 13% of lithium is wasted as SEI. In contrast, the discharge capacity of the Si NP/PMMA/lithium electrode (3426 mAh/g) is higher than the charge capacity (2961 mAh/g), as the prelithiation process already "charges" Si NP prior to electrochemical lithiation (FIG. 13A). Therefore, there should not be any capacity loss in the initial charging due to SEI formation. After two cycles at C/20, Si electrodes were further charged/discharged at C/2. While the bare silicon sample only has a capacity of 809 mAh/g after 100 cycles, the Si/PMMA/lithium sample exposed to air with 10% RH air for 30 min has a capacity of 1340 mAh/g after 100 cycles, corresponding to 58% retention. This value also approaches the result of Si/PMMA/lithium electrode not exposed to air, which is 1456 mAh/g after 100 cycles, or 63% capacity retention, suggesting that the exposure to air does not affect the cycling performance remarkably. The improved capacity retention compared to bare Si NPs is possibly a result of strain relaxation in the initial lithiation process.

Along with improved cycling performance, the average coulombic efficiency from cycle 5 to 100 also improves from 98.1% for the bare Si sample to 98.9% for the Si/PMMA/lithium electrode exposed to 10% RH air for 30 min. These results suggest that the proposed prelithiation strategy is effective for Si electrode.

To prove that this strategy of ambient air-stable lithiated anode not only compensates SEI, but also realizes fully lithiated anode to be paired with Li-free cathode, a full cell with graphite/PMMA/Li anode and $Li_4Ti_5O_{12}$ cathode was assembled and tested. Such test could act as the first step towards Li-ion batteries with high-capacity lithiated anode and lithium-free cathode (e.g. Sulfur/$Li_xSi$ system). $Li_4Ti_5O_{12}$ was chosen because (1) it does not contain active lithium, so the only lithium source in the system is lithiated graphite; and (2) it has excellent cycling performance and nearly 100% coulombic efficiency, and thus degradation observed in full cell cycling is mainly due to lithiated graphite electrode.

The lithiated graphite electrode was exposed to air with 30% RH for 30 min before assembly. In the full cell test, the total available amount of lithium is targeted to be 20% higher than the theoretical capacity of LTO (175 mAh/g). As shown in FIG. 14A, the average charging and discharging voltage are 1.5 and 1.3 V, respectively, which is consistent with the electrode potential of LTO (1.55 V vs $Li/Li^+$) and graphite (0.1-0.2 V vs. $Li/Li^+$). The initial discharge capacity was as high as 163 mAh/g, which also corresponds to 302 mAh/g for the graphite anode. The capacity remained at 137 mAh/g after 50 cycles, corresponding to a retention of 84%. Moreover, the capacity decay rate is only 0.089% per cycle at the end of 50 cycles. The loss is likely a result of lithium consumption during the reaction, such as trace amount of water in LTO and the non-100% coulombic efficiency of the graphite electrode. Such full cell performance supports that the proposed air-stable lithiated electrode could be paired with high-capacity lithium-free cathode material for a full cell.

Studies above clearly show that the proposed electrode structure may act as a lithiated anode to compensate SEI loss and even be paired with a lithium-free cathode. One aspect of some embodiments of the disclosed technology is the solvent that disperses anode materials does not dissolve the polymer coating; ethanol was used in the foregoing examples.

Figure 16A:
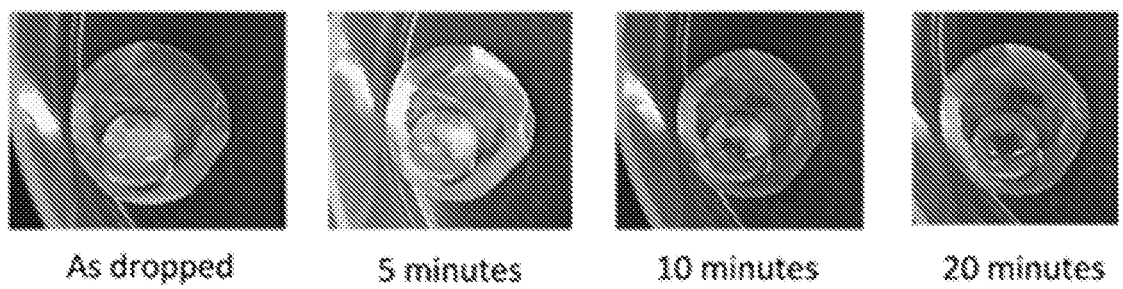
FIG. 16A illustrates the stability of PMMA-protected lithium against a water droplet for a 20 micrometer PMMA-coated lithium with a nominal capacity of 2 mAh/cm$^2$, and FIG. 16B provides images of a 100 micrometer PMMA-coated commercial lithium film (750 micrometer)—these results show that PMMA could also protect lithium from water.
Figure 16B:
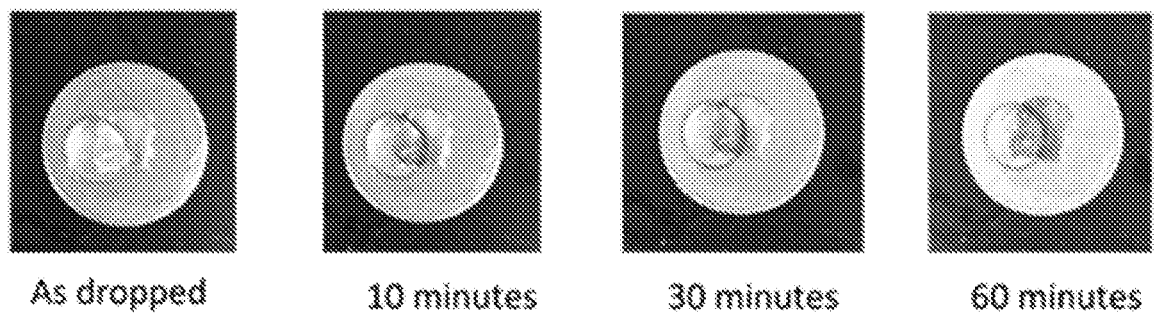

Although ethanol has been studied as a solvent for battery coating and it is environmentally friendly, water may also be used; water does not dissolve PMMA and has a low permeability in PMMA. A preliminary test shows that PMMA coated lithium electrode is also stable for a certain period when it is in contact with water. For example, when 2 $mAh/cm^2$ lithium was coated with 20 μm PMMA, the lithium remained in the same color for 5 min, and gradually become dark after 10 min (FIG. 16A). Another sample, which is 750 μm commercial lithium foil coated with 100 μm PMMA, is stable for over 30 min in contact with water (FIG. 16B). Therefore, this strategy has the potential to be compatible with aqueous slurry, which is widely used in anode coating.

In summary, a new electrode structure is developed to fabricate lithiated battery anode. In such an electrode, metallic alkali metal (e.g., Li) is protected by a sealant (e.g., PMMA) layer against air and moisture. Then active materials, such as artificial graphite or silicon nanoparticles, are coated onto the sealant in a solvent (e.g. ethanol) that does not dissolve the sealant. As the sealant is readily soluble in battery electrolyte, anode materials are in-situ lithiated in cell to form a lithiated anode. This process may be transferred to other battery systems such as, e.g., Na-ion and K-ion batteries. The electrode shows stability in ambient air under normal humidity (10-30%) for reasonable amount of time (30-60 min). The process may also be integrated with standard battery fabrication processes.

Materials and Methods
Chemicals

Artificial graphite was purchased from MTI Corp, lithium bis(trifluoromethane)sulfonimide (LiTFSI), 1,3-dioxolane, Poly(methyl methacrylate), Polyacrylic acid as purchased from Sigma Aldrich. The lithium metal foil was purchased from Alfa Aesar. Timical Super C45 carbon back was used as received. Polyvinylidene fluoride (PVdF) is received from Kynar. Si nanoparticles with diameter <80 nm is purchased from US research nanomaterials. $Li_4Ti_5O_{12}$ was received from HydroQuebec.

Electrode Preparation

To prepare the graphite/PMMA/lithium trilayer structure, lithium was first electrochemically deposited on copper from 1 M (LiTFSI) in 1,3-dioxolane at a current of 1 $mA/cm^2$ in a half cell. Then the cell was opened in a glove box and the lithium on copper electrode was washed by 1,3-dioxolane and dried. 20 μL 10 wt % PMMA (Mw ~120,000) in 1,3-dioxolane was drop cast onto this lithium electrode inside a glove box with O2<0.1 ppm and H2O<0.1 ppm. After dioxolane was evaporated, a uniform PMMA coating layer with a thickness of 20 μm was obtained. Then the sample was taken out from the glovebox and graphite/PAA (90:10 in weight) in ethanol was drop cast onto the PMMA-coated lithium electrode. The weight ratio of solid to liquid was 1:9 in the slurry. For Silicon NP electrodes, Si NPs were mixed with PAA and carbon black in ethanol with a weight ratio of 70:15:15. The typical mass loading was 3-5 $mg/cm^2$ for graphite and 0.4-0.6 $mg/cm^2$ for Si.

Material Characterizations

X-ray diffraction was performed with a PANalytical XPert3 Powder XRD. SEM images were obtained by a Hitachi S-4700 SEM. An environment with a constant humidity was created by flowing dry air continuously in a sealed vacuum chamber for various time. Then the gas flow was stopped and the humidity maintains as a constant. The relative humidity was monitored by an easy-read humidity meter (Mcmaster Carr).

Battery Assembly

After exposing to air, the anode/PMMA/Li electrode was assembled together with a lithium metal counter electrode in a pouch cell configuration. The electrolyte used was 1 M $LiPF_6$ in EC/DEC (Selecliyte LP40). For the full cell, $Li_4Ti_5O_{12}$ was used as the positive electrode without lithium, which was made by mixing with 10% PVdF and 10% carbon black in NMP (N-Methyl-2-pyrrolidone) and coating onto Al substrate.

Electrochemical Measurement

Galvanostatic Cycling was performed in the pouch cell configuration using either a Bio-logic VMP3 battery tester or a Landt Battery tester. The electrolyte is 1 M $LiPF_6$ in 1:1 ethylene carbonate and diethyl carbonate (BASF). The separator is polypropylene-polyethylene-polypropylene trilayer separator purchased from MTI.

Figure 10B:
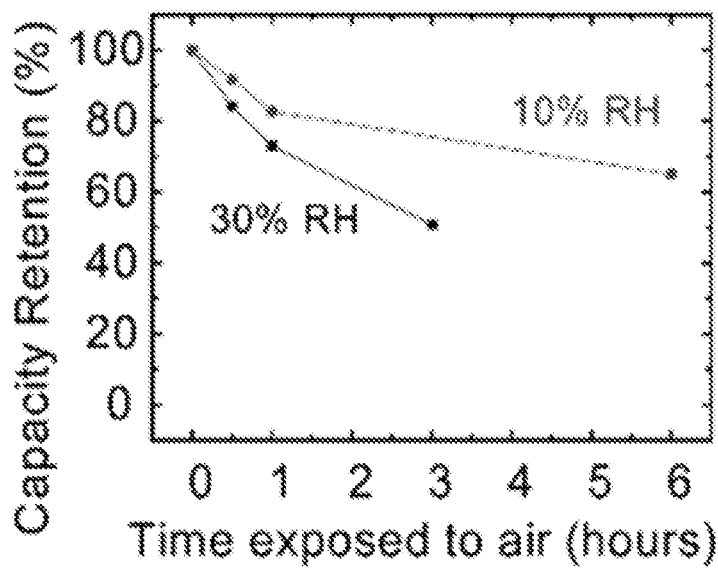

FIG. 10 shows that 40-60% of lithium electrodeposited on Cu is lost due to SEI formation and side reaction with solvent. To understand the effect of such loss on the energy density of a full cell, an NMC/Si full cell is used as an example, where Li protected by PMMA is used to compensate SEI loss in the initial cycle. The capacity per area is assumed to be 3 mAh/cm2. If the initial coulombic efficiency is 80%, the initial Li loss due to SEI formation is 0.6 mAh/cm2. In the anode/PMMA/lithium electrode, if 50% of Li deposited can be recovered, the total amount of Li deposited under PMMA needs to reach a capacity of 1.2 $mAh/cm^2$. (NMC is a cathode material, which has a formula of $Li_aNi_xMn_yCo_zO2$ (a=0.5-2), 0<x, y, z<1.)

TABLE 1

Exemplary Material Amounts

|  | NMC | Si | Lithium |
|---|---|---|---|
| Capacity (mAh/g) | 150 | 1000 | 3860 |
| Mass (mg) | 20 | 3 | 0.31 |

Therefore the amount of lithium needed is only 1.5 wt % of electrode, even if only 50% of Li could be used. If Si is replaced by graphite, the percentage of lithium to all active materials will be even lower. Hence such 50% loss of lithium does not affect energy density noticeably.

Figure 17:
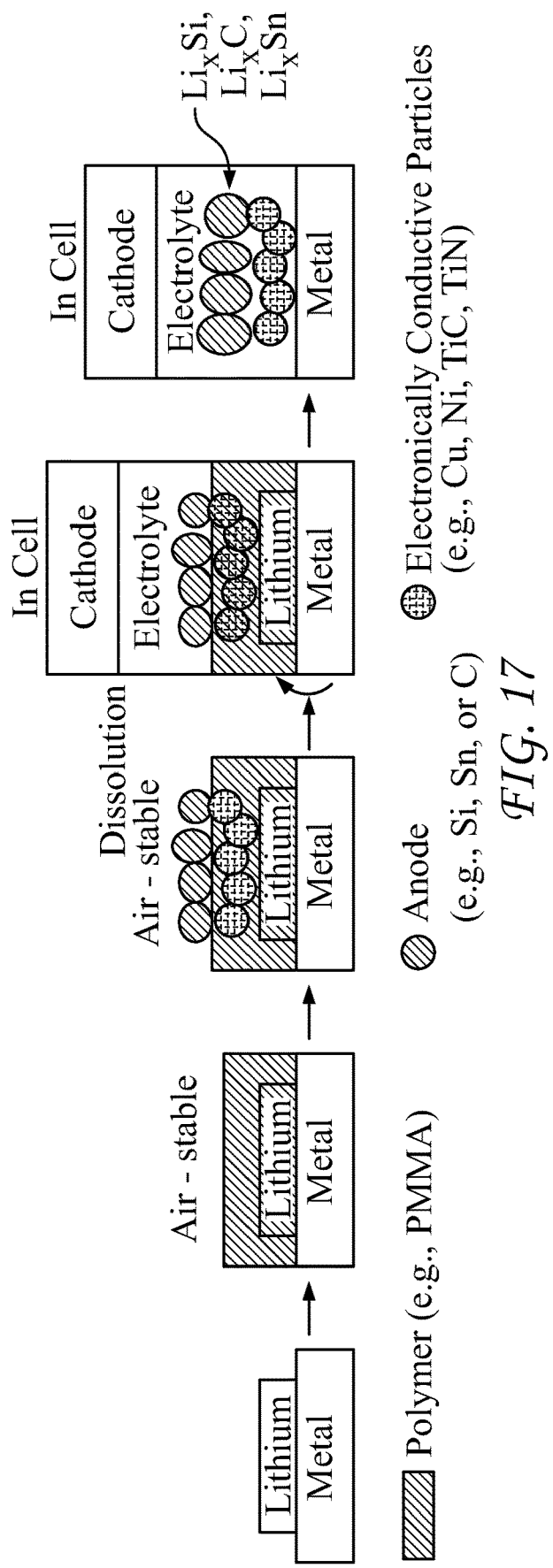
FIG. 17 illustrates an exemplary method for incorporating conductive materials into completed devices.

An exemplary method for incorporating conductive materials into a device is shown in FIG. 17. As shown in that FIG., a user may begin with an alkali metal (e.g., lithium, as shown in FIG. 17) disposed atop a conductive (e.g., metal, metal alloy) substrate. As described elsewhere herein, a sealant (e.g., a polymer, such as PMMA, as shown in FIG. 17) may then be applied to as to seal the alkali metal against the environment exterior to the alkali metal, thus providing an air-stable assembly. Conductive material (e.g., metallic particles, such as Cu, Ni, TiC, and TiN, as shown in FIG. 17) may be incorporated into the sealant; the conductive material may be incorporated into the sealant before, after, or even during the sealant's application to the alkali metal. Electrode material (anode or cathode) material may then be placed atop the sealant. As shown in FIG. 17, the electrode material may be for an anode; Si, Sn, and C are exemplary anode materials. The user may then effect dissolution of the sealant via introduction of an appropriate electrolyte; with dissolution of the sealant, the alkali metal and conductive particles become incorporated within the electrode material. In the exemplary embodiment shown in FIG. 17, with suitable placement of a cathode the electrolyte then places the cathode into electronic communication with an anode that includes both the alkali metal and the conductive material.

In an alternative embodiment, a user may incorporate conductive material into a cathode. By reference to FIG. 17, a user might (1) replace the anode material shown in FIG. 17 with a material for cathode use, e.g., sulfur, or $V_2O_5$, as shown in FIG. 6; and (2) replace the cathode with an anode. Following dissolution of the conductive material-containing sealant, the conductive material and the alkali metal become incorporated into the cathode, and the electrolyte places the anode into electronic communication with a cathode that includes both the alkali metal and the conductive material.

What is claimed:

1. An energy storage device, comprising:
a first electrode comprising a first electrode material;
a second electrode;
a separator disposed between the first electrode and the second electrode the separator including:
an alkali metal material layer;
a polymer sealant layer; and
an amount of a slurry surrounding the sealant, the slurry comprising a slurry solvent and an amount of a second electrode material dispersed within the slurry solvent; and
an electrolyte that places the first electrode into electronic communication with the second electrode.

2. The energy storage device of claim 1, wherein the first electrode material is porous.

3. The energy storage device of claim 1, wherein the amount of first electrode material has a characteristic cross-sectional dimension in the range of from about 1 micrometer to about 1 mm.

4. The energy storage device of claim 1, wherein the first electrode material comprises silicon, carbon, a metal, a metal oxide, sulfur, or any combination thereof.

5. The energy storage device of claim 1, wherein the first electrode material has an electrode potential (as applied to an anode) of less than about 3 V versus Li/Li+.

6. The energy storage device of claim 1, wherein the second electrode material comprises an alkali metal.

7. The energy storage device of claim 1, wherein the electrolyte is characterized as being an organic electrolyte.

8. The energy storage device of claim 1, wherein the electrolyte comprises carbonate.

9. The energy storage device of claim 1, wherein at least one of the first and second electrode materials comprises an additive that comprises a metal, carbon, or any combination thereof.

10. The energy storage device of claim 1, wherein a concentration of alkali material in the alkali metal material layer is a gradient.

11. The energy storage device of claim 1, wherein the separator includes a first surface and a second surface opposing the first surface, and further includes a first alkali metal material layer disposed on the first surface and a second alkali metal material layer disposed on the second surface.

12. A workpiece, comprising:
a conductive substrate;
a first electrode comprising a first electrode material disposed on the conductive substrate;
a separator disposed on the first electrode, the separator including:
one or more alkali metal layers;
a sealant disposed over the one or more alkali metal material layers so as to seal the amount of alkali metal against the environment exterior to the amount of alkali metal; and
an amount of a slurry surrounding the sealant, the slurry comprising a slurry solvent and an amount of a second electrode material dispersed within the slurry solvent.

13. The workpiece of claim 12, wherein the sealant comprises a polymer.

14. The workpiece of claim 12, wherein the sealant has disposed within an amount of a conductive material.

15. The workpiece of claim 12, wherein the slurry solvent is substantially non-reactive with the sealant.

16. The workpiece of claim 12, wherein the second electrode material is in fluid communication with an electrolyte capable of dissolving the sealant.

17. A method of fabricating an energy storage device, comprising:
disposing an amount of an alkali metal atop a separator;
with a sealant, sealing the amount of alkali metal on the separator against the environment exterior to the amount of alkali metal;
disposing a first electrode material on a conductive substrate;
providing a slurry to the sealant, the slurry comprising a slurry solvent and an amount of a second porous electrode material dispersed within the slurry solvent, giving rise to an amount of the second porous electrode material surmounting the sealant; and contacting the amount of the second porous electrode material with an electrolyte under such conditions that at least a portion of the sealant dissolved in the electrolyte and the alkali metal is integrated with the second electrode material.

18. The method of claim 17, wherein the conductive substrate comprises a metal.

19. The method of claim 17, wherein the first electrode material comprises silicon, carbon, a metal, a metal oxide, sulfur, or any combination thereof.

20. The method of claim 17, wherein the first electrode material comprises a electrochemically active material having an electrode potential of less than about 3 V versus Li/Li+.

* * * * *